US012806112B2

(12) United States Patent
Smith et al.

(10) Patent No.: US 12,806,112 B2
(45) Date of Patent: Nov. 24, 2026

(54) PERSON SUPPORT SYSTEMS INCLUDING SEPARATELY SELECTABLE ALTERNATING PRESSURE ZONES

(71) Applicant: HILL-ROM SERVICES, INC., Batesville, IN (US)

(72) Inventors: Kathryn Smith, Batesville, IN (US); Taylor Franklin, Batesville, IN (US); Frank E. Sauser, Cincinnnati, OH (US)

(73) Assignee: HILL-ROM SERVICES, INC., Batesville, IN (US)

( * ) Notice: Subject to any disclaimer, the term of this patent is extended or adjusted under 35 U.S.C. 154(b) by 1014 days.

(21) Appl. No.: 17/703,355

(22) Filed: Mar. 24, 2022

(65) Prior Publication Data

US 2022/0304885 A1 Sep. 29, 2022

Related U.S. Application Data

(60) Provisional application No. 63/166,796, filed on Mar. 26, 2021.

(51) Int. Cl.
*A61H 9/00* (2006.01)
*A61H 1/00* (2006.01)
*A61H 23/04* (2006.01)

(52) U.S. Cl.
CPC ........... *A61H 9/0078* (2013.01); *A61H 1/005* (2013.01); *A61H 9/0007* (2013.01); *A61H 23/04* (2013.01);

(Continued)

(58) Field of Classification Search
CPC .... A61H 9/0078; A61H 9/0007; A61H 1/005; A61H 23/04; A61H 2201/0142;

(Continued)

(56) References Cited

U.S. PATENT DOCUMENTS 5,611,772 A * 3/1997 Fujimoto ............. A61H 9/0078 601/149
7,191,482 B2 3/2007 Romano et al.

(Continued)

FOREIGN PATENT DOCUMENTS

CN 109124162 A 6/2021
GB 2568875 A 6/2019

*Primary Examiner* — Timothy A Stanis
*Assistant Examiner* — Matthew R Moon
(74) *Attorney, Agent, or Firm* — DINSMORE & SHOHL LLP

(57) ABSTRACT

Person support systems, controllers, methods, and computer program products. A computer program product for controlling a person support surface includes program instructions stored thereon that cause a controller to receive an input corresponding to at least one selected sector of the person support surface and a selected air therapy, determine which of a plurality of zones of bladders of the person support surface are located within the selected sector, generate a control schedule that directs an inflation level of each of the zones of bladders within the selected sector based on the selected air therapy, and instruct an air supply and at least one air control box in accordance with the control schedule to adjust an internal air pressure of each of the plurality of bladders independently of one another while providing a different internal air pressure of each remaining bladder located outside the selected sector.

20 Claims, 10 Drawing Sheets

(52) U.S. Cl.
CPC ................ *A61H 2201/0142* (2013.01); *A61H 2201/1409* (2013.01); *A61H 2201/5002* (2013.01); *A61H 2201/5023* (2013.01); *A61H 2201/5056* (2013.01)

(58) Field of Classification Search
CPC .... A61H 2201/1409; A61H 2201/5002; A61H 2201/5023; A61H 2201/5056; A61H 23/006; A61H 2201/1238; A61G 7/05769; A61G 7/015; A61G 7/001; A61G 7/05; A61G 7/0573; A61G 7/05776
See application file for complete search history.

(56) References Cited

U.S. PATENT DOCUMENTS

2007/0266499 A1 11/2007 O'Keefe et al.
2009/0095322 A1* 4/2009 Wakao ...................... B08B 9/34 134/135
2011/0258780 A1* 10/2011 O'Keefe ............ A61G 7/05792 5/618
2012/0022414 A1* 1/2012 Receveur ............. A61H 9/0078 601/152
2013/0061396 A1* 3/2013 Lafleche .............. A61H 23/006 5/706
2013/0081208 A1* 4/2013 Dyevich .............. A47C 27/144 5/727
2014/0115790 A1* 5/2014 Romano .............. A61G 5/1045 5/652.2
2016/0317370 A1* 11/2016 Evans .................... G05B 15/02
2017/0266070 A1* 9/2017 Bobey ................ A61G 7/05769
2018/0064593 A1* 3/2018 Meyer .................... A61G 7/015
2019/0133873 A1* 5/2019 Chase .................. A61H 9/0078
2019/0174930 A1* 6/2019 DeFranks ............ A47C 21/044
2019/0183257 A1 6/2019 Arzanpour et al.

* cited by examiner

PERSON SUPPORT SYSTEMS INCLUDING SEPARATELY SELECTABLE ALTERNATING PRESSURE ZONES

CROSS REFERENCE TO RELATED APPLICATION

The present application claims the priority benefit of U.S. Provisional Application Ser. No. 63/166,796 entitled "PERSON SUPPORT SYSTEMS INCLUDING SEPARATELY SELECTABLE ALTERNATING PRESSURE ZONES" and filed Mar. 26, 2021, the contents of which are hereby incorporated herein in its entirety.

BACKGROUND

Field

The present disclosure generally relates to person support systems including alternating pressure (AP) surfaces, and more specifically, to person support systems including AP sectors that can be selectively activated or deactivated independently of one another.

Technical Background

Certain active subject support surfaces have the ability to change load distribution with or without an applied load by utilizing a plurality of bladders that are inflated, deflated, or vented based on particular scenarios. For example, some support surfaces incorporate AP features that allow for pressure redistribution via cyclic changes in the loading and unloading (e.g., inflation and deflation of air filled cells) as characterized by frequency, duration, amplitude, and/or rate of change parameters.

However, such active subject support surfaces may be uncomfortable for the subjects supported thereon. For example, a subject may experience discomfort when the support surface decreases pressure in certain areas while increasing pressure in other areas. In another example, a subject may experience motion sickness type symptoms from the constant movement subjected to them when AP features are actuated. However, existing active subject support surfaces do not allow for AP features or other types of active support to be turned off in particular areas while at the same time maintaining AP or other types of active support in other areas.

SUMMARY

In one aspect, a person support system includes a person support surface having a plurality of bladders arranged within a support cushion layer and a foot bladder layer, each one of the plurality of bladders fluidly sealed from each other one of the plurality of bladders. The person support system further includes an air supply fluidly coupled to the plurality of bladders such that air is supplied by the air supply to each one of the plurality of bladders. The person support system further includes at least one air control box fluidly coupled to the air supply and the plurality of bladders, the at least one air control box configured to direct air from the air supply to periodically inflate and deflate a plurality of zones of bladders of the support cushion layer and the foot bladder layer to provide air therapy. The person support system further includes a controller communicatively coupled to the air supply and the at least one air control box. The controller is configured to receive an input corresponding to at least one selected sector of a plurality of sectors of the person support surface and a selected air therapy for the at least one selected sector, determine which of the plurality of zones of bladders are located within the at least one selected sector, generate a control schedule that directs an inflation level of each of the zones of bladders within the at least one selected sector based on the selected air therapy, and instruct the air supply and the at least one air control box in accordance with the control schedule to adjust an internal air pressure of each of the plurality of bladders of each of the zones within the at least one selected sector independently of one another while providing a different internal air pressure of each remaining bladder located outside the at least one selected sector.

In another aspect, a person support system includes a person support surface having a plurality of bladders, an air supply fluidly coupled to the plurality of bladders such that air is supplied by the air supply independently to each one of the plurality of bladders, and an air control box fluidly coupled to the air supply and the plurality of bladders. The air control box is configured to cause air from the air supply to periodically inflate and deflate a plurality of zones of bladders to provide air therapy. The person support system further includes a controller communicatively coupled to the air supply and the air control box, the controller configured to determine which of the plurality of zones of bladders are located within a sector selected via a user interface, generate a control schedule that directs an inflation level of each of the zones of bladders only within the at least one selected sector based on the selected air therapy, and instruct the air supply and the at least one air control box in accordance with the control schedule.

In yet another aspect, a controller for a person support system includes program instructions for causing the controller to receive an input corresponding to at least one selected sector of a plurality of sectors of a person support surface and a selected air therapy for the at least one selected sector, determine which of a plurality of zones of bladders of the person support surface are located within the at least one selected sector, generate a control schedule that directs an inflation level of each of the zones of bladders within the at least one selected sector based on the selected air therapy, and instruct an air supply and at least one air control box in accordance with the control schedule to adjust an internal air pressure of each of the plurality of bladders of each of the zones within the at least one selected sector independently of one another while providing a different internal air pressure of each remaining bladder located outside the at least one selected sector.

In yet another aspect, a method includes receiving, by a controller associated with a person support surface, an input corresponding to at least one selected sector of a plurality of sectors of the person support surface and a selected air therapy for the at least one selected sector; determining which of a plurality of zones of bladders of the person support surface are located within the at least one selected sector; generating a control schedule that directs an inflation level of each of the zones of bladders within the at least one selected sector based on the selected air therapy; and instructing an air supply and at least one air control box associated with the person support surface in accordance with the control schedule to adjust an internal air pressure of each of the plurality of bladders of each of the zones within the at least one selected sector independently of one another while providing a different internal air pressure of each remaining bladder located outside the at least one selected sector.

In still another aspect, a computer program product for controlling a person support surface includes one or mote program instructions stored thereon that, when executed, cause a controller associated with the person support surface to receive an input corresponding to at least one selected sector of a plurality of sectors of the person support surface and a selected air therapy for the at least one selected sector, determine which of a plurality of zones of bladders of the person support surface are located within the at least one selected sector, generate a control schedule that directs an inflation level of each of the zones of bladders within the at least one selected sector based on the selected air therapy, and instruct an air supply and at least one air control box in accordance with the control schedule to adjust an internal air pressure of each of the plurality of bladders of each of the zones within the at least one selected sector independently of one another while providing a different internal air pressure of each remaining bladder located outside the at least one selected sector.

Additional features and advantages of the aspects described herein will be set forth in the detailed description which follows, and in part will be readily apparent to those skilled in the art from that description or recognized by practicing the aspects described herein, including the detailed description, which follows, the claims, as well as the appended drawings.

It is to be understood that both the foregoing general description and the following detailed description describe various aspects and are intended to provide an overview or framework for understanding the nature and character of the claimed subject matter. The accompanying drawings are included to provide a further understanding of the various aspects, and are incorporated into and constitute a part of this specification. The drawings illustrate the various aspects described herein, and together with the description serve to explain the principles and operations of the claimed subject matter.

BRIEF DESCRIPTION OF THE DRAWINGS

The aspects set forth in the drawings are illustrative and exemplary in nature and not intended to limit the subject matter defined by the claims. The following detailed description of the illustrative aspects can be understood when read in conjunction with the following drawings, wherein like structure is indicated with like reference numerals and in which:

DETAILED DESCRIPTION

Figure 1:
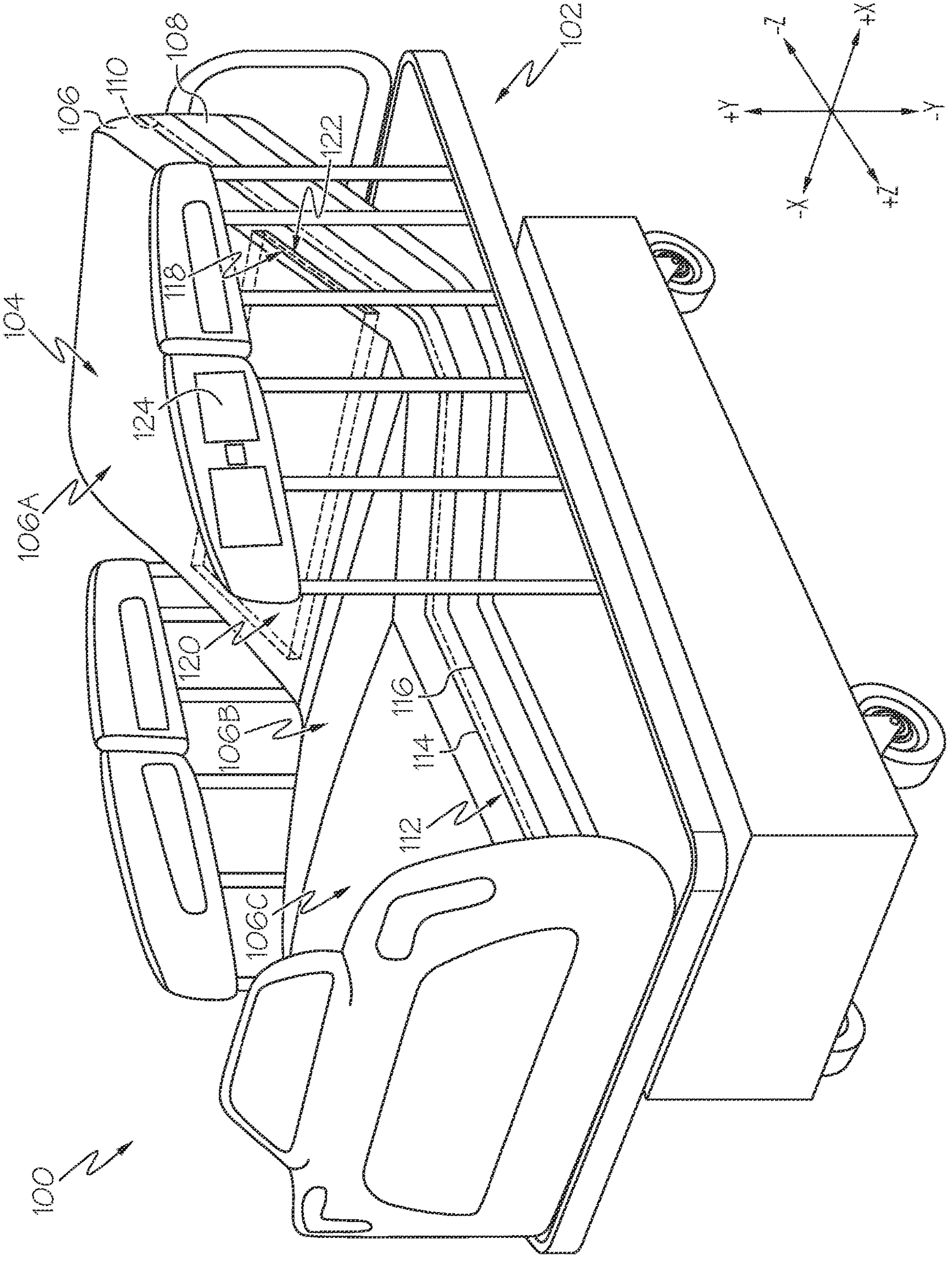
FIG. 1 depicts an illustrative person support system that includes a person support apparatus with a person support surface positioned thereon according to one or more aspects shown and described herein.

The present disclosure relates generally active person support surfaces that include, among other features, air therapy surfaces that can be independently adjusted in sectors to reduce motion sickness and/or increase the comfort of subjects supported thereon. More particularly, the active person support surfaces described herein may allow for a plurality of sectors, each of which is selectable independently of the other sectors, such that air therapy such as AP, ALP, or other types of active support can be turned off while at the same time maintaining air therapy in other sectors. According to various aspects described herein, a person support system may include a person support surface and a person support apparatus. The person support surface of the present disclosure may include a stack of internal layers such as a surface foundation layer, a plurality of person support surface layers (e.g., a turn assist bladder layer, a working cushion layer, a support cushion layer, a percussion and vibration bladder, an advanced articulation bladder, and/or the like) positioned within the surface foundation layer, a foot bladder layer, and a microclimate management (MCM) layer. The various layers described herein may be fluidly coupled to one or more air supplies that provide air or remove air from various components. In addition, a plurality of valves and/or manifolds may be used to direct fluid flow between the air supplies and the various layers described herein. The air supplies, valves, and/or manifolds are controlled by a control system that is configured to direct particular amounts of air to particular areas based on the concepts described herein. The control system can be directed to operate in a certain manner via a user interface.

Active person support surfaces are generally powered support surfaces that are configured to alter load distributions with or without an applied load thereon. Support surfaces with AP features provide pressure redistribution via cyclic changes in the loading and unloading (inflation and deflation of air filled cells) as characterized by frequency, duration, amplitude, and/or rate of change parameters. Such AP features may be an effective method to prevent and/or treat pressure injuries. One of the limitations or drawbacks of the AP features is that such AP features may be uncomfortable to certain subjects. That is, when AP features are activated in certain areas of the person support surface, the AP features increase pressure in other support areas of the subject supported by the person support surface. Such an increase in other support areas can be uncomfortable to the a subject supported by the support surface (which may also depend on a size of a bladder, a location of a bladder, a configuration of a bladder, a pressure of a bladder, and/or the like). Further, in some instances, the oscillating movement of the support surface that results from pressure changes may cause a subject supported thereon to experience motion sickness feelings.

The present disclosure relates to systems that allow for selection of air therapy such as AP at particular sectors of the support surfaces described herein, thereby allowing for air therapy only at particular locations of a subject's body when the subject is supported by the support surfaces described herein. For example, if a particular subject supported by the support surfaces described herein experiences issues relating to motion sickness, the systems described herein are adapted to deactivate, minimize, or change the air therapy in a particular section of the support surface to alleviate the motion sickness issues (e.g., the torso section of the support surface). Such a deactivation, minimization, or change of a particular section would still allow air therapy from other sections of the support surface (e.g., the seat section and sections distal therefrom where a large majority of existing pressure injuries occur). Reducing motion of particular areas of a subject (e.g., on the upper body of the subject) by deactivating, changing, or changing air therapy on corresponding areas of the support surface may reduce the likelihood of issues such as motion sickness while still providing air therapy to areas of the subject where air therapy may be most useful. In addition, some subjects experience discomfort issues with a support surface in the back section of the subject. By providing an option of deactivating therapy such as AP and providing a low constant pressure in an area of the support surface that corresponds to the subject's back improves subject comfort.

The present disclosure relates to any type of air therapy now known or later developed, including AP. That is, the present disclosure further relates to systems that allow for sector selectable alternating low pressure (ALP). Specifically, the selectable ALP sectors would allow for a therapy to be utilized that is not compatible with ALP, while continuing ALP (or another type of active support) in other sectors. For example, the systems described herein may be particularly configured to deactivate ALP on the support surface in a sector that corresponds to a torso of a subject supported on the support actuate to run percussion and vibration (P&V) therapy devices while ALP continues under other sectors of the support surface (e.g., sectors corresponding to a subject's seat and/or heels). In another example, the system can be configured to deactivate ALP in a sector of the support surface corresponding to the heels of the subject supported thereon, thereby allowing the caregiver to place a specific therapy device on the sector of the support surface, while ALP continues in other sections (e.g., sectors corresponding to the torso and seat of the subject supported thereon).

Existing support surfaces merely allow for a creation of zones in which pressure is adjusted for one or more particular zones. Such support surfaces do not allow for use of AP, ALP, P&V, and/or the like in a particular sector of the support surface comprising a plurality of zones while at the same time deactivating AP, ALP, P&V, and/or the like in other sectors, as described herein.

It should be understood that the term "sector" as used in the present disclosure relates to a particular area of a person support surface that encompasses a plurality of zones of components (e.g., bladders) that is independent from the zones that are described herein. That is, while conventional AP therapy relates to various "zones" of bladders, such zones are used to describe groupings of bladders that are inflated, deflated, or vented according to a particular AP schedule to effect AP therapy. In contrast, the sectors of the present disclosure includes groupings of these zones in particular areas of the person support surfaces described herein where it may be desirable to turn off AP therapy (or other therapies described herein), while maintaining AP therapy (or other therapies described herein) in other sectors that contain other zones of bladders. As will be described in greater detail herein, the person support surfaces described herein may include sectors such as, but not limited to, one or more head sectors, one or more seat sectors, and/or one or more foot sectors, each sector containing a plurality of zones of bladders.

It should be understood that the term "air therapy" as used herein is meant to encompass any type of therapy that includes manipulating one or more bladders, including therapies now known or later developed. Illustrative therapies include, but are not limited to, alternating pressure (AP) therapy, alternating low pressure (ALP) therapy, continuous low pressure (CLP) therapy, continuous lateral rotation therapy (CLRT), percussion and vibration (P&V) therapy, and/or the like.

The person support apparatuses described herein may include a standard person support apparatus, an advanced articulation person support apparatus, and/or a chair egress person support apparatus (e.g., available from Hill-Rom Holdings, Inc. (Batesville, IN)). An advanced articulation person support apparatus may support progressive subject mobility stages including a breathe stage (e.g., maintaining optimal head-of-bed (HOB) angle per ventilator-acquired pneumonia (VAP) protocols, avoiding pulmonary complications via continuous lateral rotation therapy (CLRT), and improving respiratory efficiency via percussion and vibration (P&V) therapies, and/or the like), a tilt stage (e.g., maintaining optimal HOB angle per VAP protocols, providing orthostatic conditioning via an 18° reverse Trendelenburg-tilt table, and/or the like), and a sit stage (e.g., facilitating gas exchange via a partial chair position, allowing lung expansion via a chair egress position, preventing subject migration and minimizing repositioning via a stay-in-place system that responds to HOB angle, and/or the like). A chair egress person support apparatus may support progressive subject mobility stages including a stand stage (e.g., building subject strength via a chair egress positions, providing partial weight bearing via a sit-to-stand lift system, and/or the like) and a move stage (e.g., realizing out-of-bed orders via the chair egress positions and/or the sit-to-stand lift system, and/or the like). A standard person support apparatus may or may not support the above-described features and/or may include an add-on (e.g., a "topper" surface to resist or mitigate skin tissue breakdown).

Aspects of the present disclosure include person support surfaces that include a combination of components that realize a plurality of features and functionalities such that the person support surfaces are interchangeably usable on and/or compatible with such person support apparatuses (e.g., the standard person support apparatus, the advanced articulation person support apparatus, the chair egress person support apparatus, and/or the like). Accordingly, each person support surface may allow more than one different person support apparatus to support a wide range of air therapies (i.e., CLRT, P&V, CLP, ALP and/or the like) while still allowing for deactivation or activation of particular sectors, as described herein. Each person support surface, as described herein, may be configured for use in an intensive care unit (ICU) facility, environment, and/or platform. Each person support surface, as described herein, may further include varying widths (e.g., from about 36 inches (91.44 cm) wide to about 40 inches (101.6 cm) wide.

Turning now to the drawings, FIG. 1 depicts an illustrative person support system 100 that includes a person support apparatus 102 with a person support surface 104 positioned thereon, according to various aspects described herein. As depicted in FIG. 1, the person support surface 104 may include a top encasement portion 106 coupled to a bottom encasement portion 108. The coupled top encasement portion 106 and bottom encasement portion 108 define an internal cavity to house the various internal components as described herein. The person support surface 104 may define a head section 106A, a seat section 106B, and a foot section 106C. In some aspects, the top encasement portion 106 may be securely coupled to the bottom encasement portion 108 via an interlocking device 110 that extends around a perimeter of the person support surface 104. In such aspects, a first portion of the interlocking device 110 may be attached to the top encasement portion 106 and a second portion of the interlocking device 110 may be attached to the bottom encasement portion 108. One of the first portion or the second portion of the interlocking device 110 may include an interlocking device actuator (e.g., zipper pull tab, slider, or the like). In other aspects, the interlocking device 110 may extend around a portion of the perimeter of the person support surface 104. The interlocking device 110 may be a zipper and/or the like in some aspects, or may be a permanent coupling a thermoplastic weld).

According to various aspects, the top encasement portion 106 and the bottom encasement portion 108 may be defined by a fluid-resistant and/or fluid-proof material. In some aspects, the top encasement portion 106 and/or the bottom encasement portion 108 may be defined by a two-ply fabric. The seams (e.g., corners, edges, and/or the like) of the top encasement portion 106 and the bottom encasement portion 108 may be welded (e.g., thermoplastic welded) together or taped in lieu of being sewn (e.g., to avoid fluid access holes/points). Furthermore, the interlocking device 110 may be constructed to be fluid-resistant. For example, as depicted in FIG. 1, the top encasement portion 106 may include fluid flap 112 having a first edge 114 permanently coupled adjacent the interlocking device 110 and a second edge 116 that extends over and/or beyond the interlocking device 110. Accordingly, any fluids flowing on and/or over the top encasement portion 106 may not permeate the top encasement portion 106, but rather may flow off the person support surface 104 via the fluid flap 112 without interfacing with the interlocking device 110. According to various aspects, the person support surface 104 is fluid-resistant and/or fluid-proof for cleansing and/or disinfection purposes (e.g., so that no contaminants can get to the inside of person support surface 104).

According to various aspects, the top encasement portion 106 and/or the bottom encasement portion 108 may be removable and/or replaceable. Accordingly, if the top encasement portion 106 and/or the bottom encasement portion 108 is in need of replacement (e.g., every "Y" years of use, due to a puncture, damage, due to exposure to infectious agents, bodily fluids, or the like) it can be removed by disengaging (e.g., unzipping) the first portion of the interlocking device 110 from the second portion of the interlocking device 110 such that a replacement top encasement portion 106 and/or a replacement bottom encasement portion 108 may be installed by engaging (e.g., zipping) its respective first portion and/or second portion of the interlocking device 110 to the remaining/new second portion and/or first portion of the interlocking device 110, respectively, while maintaining other components that need not be replaced.

Still referring to FIG. 1, the top encasement portion 106 may further include a sleeve interlocking device 118 (e.g., a zipper and/or the like) to access a sleeve 120 (e.g., an X-ray sleeve) coupled to the top encasement portion 106. In various aspects, the sleeve 120 may be defined on a bottom surface and/or an internal surface of the top encasement portion 106. In one aspect, a perimeter of a top surface of the sleeve 120 may be coupled (e.g., thermoplastic welded) to the bottom surface of the top encasement portion 106. In another aspect, a perimeter of a first side (e.g., in the −x direction of the coordinate axes of FIG. 1) and/or a perimeter of a second side (e.g., in the +x direction of the coordinate axes of FIG. 1) of the sleeve 120 may be coupled (e.g., thermoplastic welded) to a first internal side (e.g., in the −x direction of the coordinate axes of FIG. 1) and/or a second internal side (e.g., in the +x direction of the coordinate axes of FIG. 1) of the top encasement portion 106, respectively. In such an aspect, an aperture may be defined between the top surface of the sleeve 120 and the bottom surface of the top encasement portion 106.

The sleeve 120 may be adapted to receive various components therein. For example, the sleeve interlocking device 118 may be opened to insert, slide and/or place a medical device and/or medical equipment (e.g., X-ray cassette, or the like) within the sleeve 120 under a subject positioned on the person support surface 104. As depicted in FIG. 1, the sleeve 120 may extend across a width of the person support surface 104 to maximize an area of the person support surface 104 on which the subject can be positioned to lie while a medical procedure (e.g., X-ray) is performed. The sleeve 120 permits the medical device, medical equipment, or the like, to be utilized through a portion of the person support surface 104 without exposure to any internal components (e.g., as described herein) of the person support surface 104. For example, in aspects where the first side and second side of the sleeve are coupled (e.g., thermoplastic welded) to the first internal side and the second internal side of the top encasement portion 106, respectively, the medical device, medical equipment, or the like may be inserted and/or removed through a first interlocking device (e.g., sleeve interlocking device 118) on the second side (e.g., in the +x direction of the coordinate axes of FIG. 1) and/or a second interlocking device on the second side (e.g., in the −x direction of the coordinate axes of FIG. 1, not shown) without being exposed to any internal components of the person support surface 104 (e.g., sleeve 120 defines an opening through which medical devices, medical equipment, or the like, can pass). Furthermore, after use of the medical device, medical equipment, or the like, the internal surfaces of the sleeve 120 may be cleaned and/or disinfected without exposing any internal components of the person support surface 104. Accordingly, the person support surface 104 may be fluid-resistant and/or fluid-proof for cleansing and/or disinfection purposes (e.g., such that no contaminants can get to the inside of the person support surface 104). Overall, the sleeve 120, as depicted in FIG. 1, may further avoid and/or minimize subject moves (e.g., less risk to the subject and/or caregiver injury) as well as minimize interference and/or blockage within an image (e.g., an X-ray image) due to various components, as described herein, internal to the person support surface 104. The top encasement portion 106 may further include a sleeve fluid flap 122 having a first edge coupled adjacent the sleeve interlocking device 118 and a second edge that extends over and/or beyond the sleeve interlocking device 118. Accordingly, any fluids flowing on and/or over the top encasement portion 106 may not permeate the top encasement portion 106 and may flow off the person support surface 104 via the sleeve fluid flap 122 without interfacing with the sleeve interlocking device 118.

While FIG. 1 depicts the sleeve 120 positioned in the head section 106A of the person support surface 104, the present disclosure is not limited to such. That is, according to other aspects, the sleeve 120 may be similarly positioned to correspond with the seat section 106B and/or the foot section 106C of the person support surface 104. In some aspects, a plurality of sleeves may be utilized (e.g., a sleeve 120 in each of the head section 106A, the seat section 106B, and the foot section 106C). In some aspects, the sleeve 120 may extend across any width and/or any length of the person support surface 104. In some aspects, the sleeve interlocking device 118 may include two interlocking device actuators (e.g., zipper pull tabs/sliders) to open access to the sleeve 120 at a desired position and to minimize exposure of internal surfaces of the sleeve 120. In some aspects, the sleeve interlocking device 118 and/or its corresponding sleeve fluid flap 122, as described herein, may be positioned on the first lateral side (e.g., in the −x direction of the coordinate axes of FIG. 1), the second lateral side (e.g., in the +x direction of the coordinate axes of FIG. 1), the proximal side (e.g., in the −z direction of the coordinate axes of FIG. 1) and/or the distal side (e.g., in the +z direction of the coordinate axes of FIG. 1) of the person support surface 104 (e.g., to access the sleeve 120 from any side of the person support surface 104). According to yet further aspects, the sleeve 120 may be defined on a top surface (e.g., in the +y direction of the coordinate axes of FIG. 1) of the top encasement portion 106. In such aspects, a material that defines the sleeve 120 may be coated such that the sleeve 120 is fluid-resistant and/or fluid-proof.

Also depicted in FIG. 1 is a user interface 124 that may be used to allow a user to control various aspects of the person support system 100. For example, a user may be able to control which sector(s) in which to actuate certain features, such as AP or the like, by selecting the corresponding sector(s) depicted on the user interface 124. The user interface 124 may also allow a user to select actuation of various other components described herein. As will be described in greater detail herein, the user interface 124 generally includes a display and/or one or more input devices that receive inputs from a user.

Figure 2:
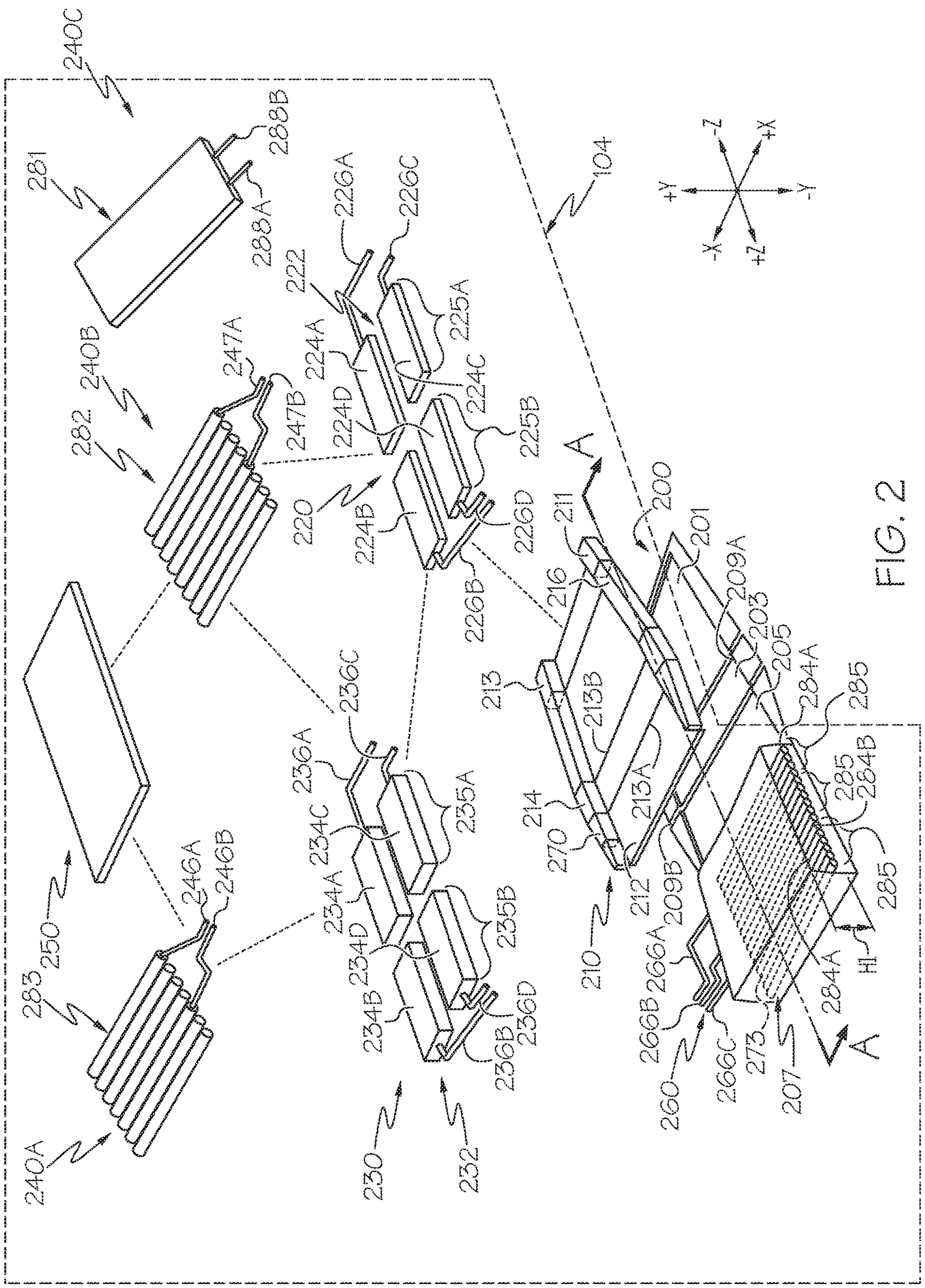
FIG. 2 depicts an exploded perspective view of various illustrative internal component combinations of the person support surface of FIG. 1 according to one or more aspects shown and described herein.
Figure 3:
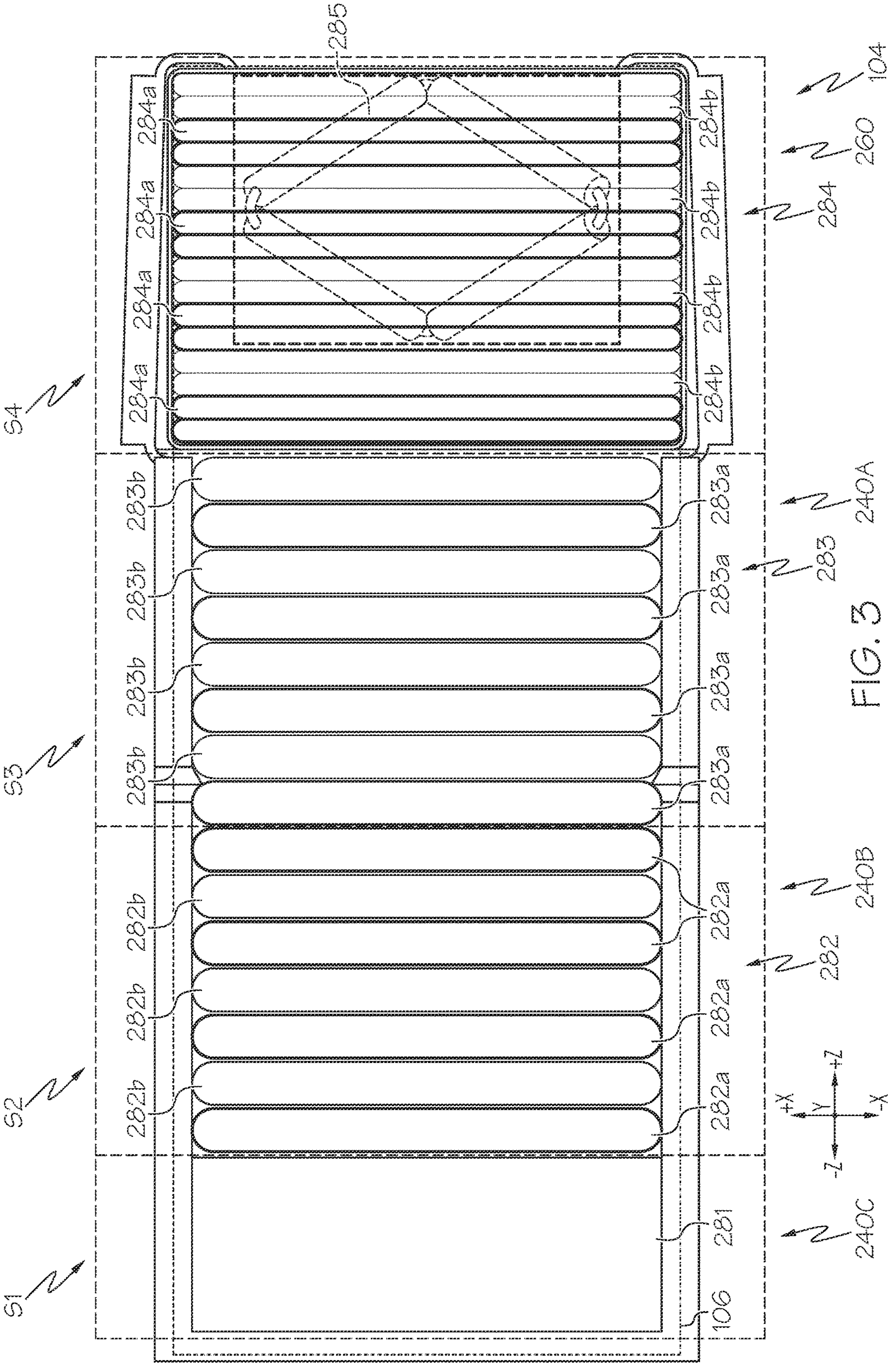
FIG. 3 schematically depicts a top view of the various illustrative internal components of the person support surface of FIG. 1 with a top encasement portion removed according to one or more aspects shown and described herein.
Figure 4:
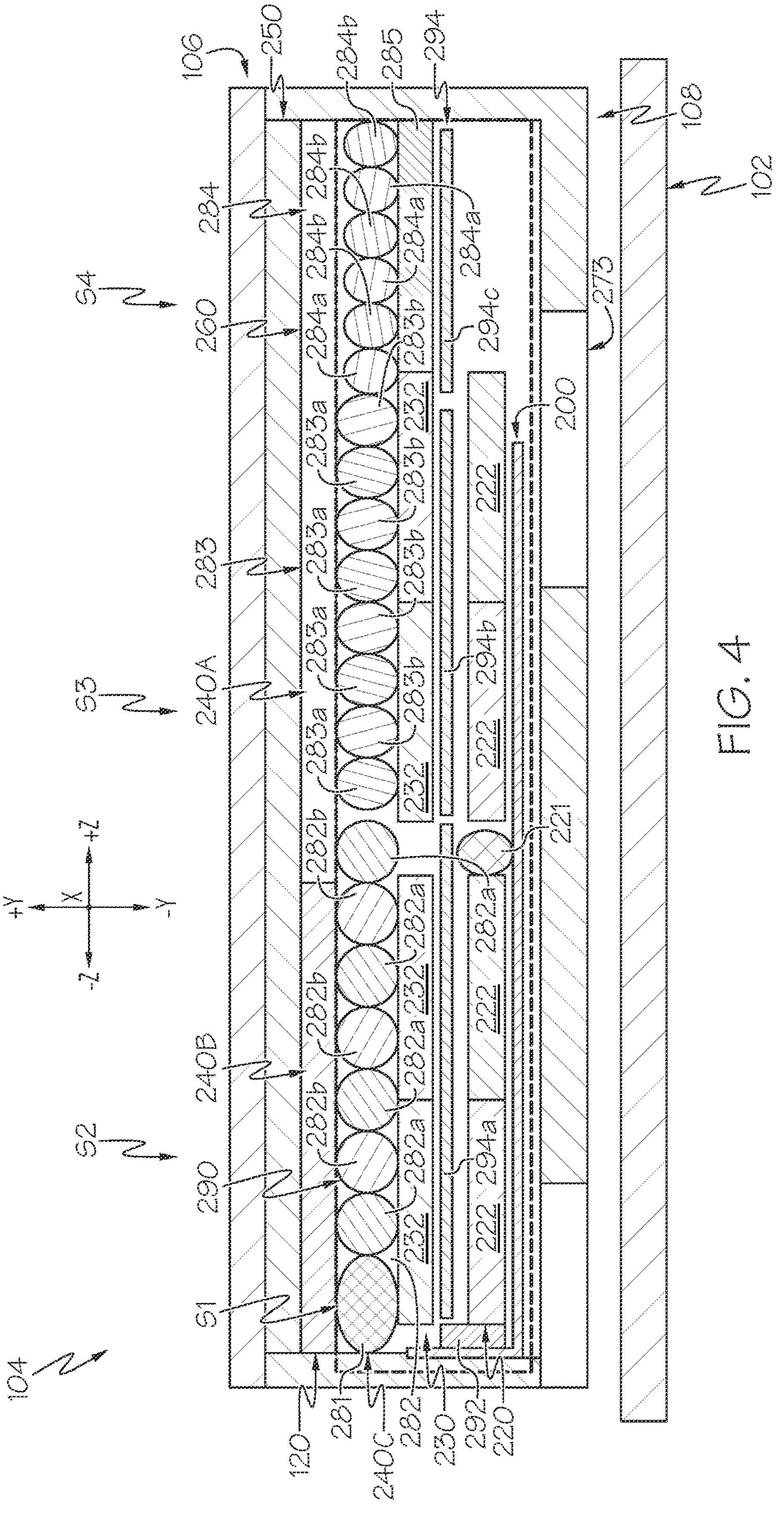
FIG. 4 schematically depicts a cross sectional side view of the various illustrative internal components of the person support surface of FIG. 1 according to one or more aspects shown and described herein.

FIG. 2 depicts an exploded perspective view of various illustrative internal component combinations of the person support surface 104. FIG. 3 depicts a top view of the person support surface 104, with the top encasement portion 106 shown in phantom such that various illustrative internal component combinations of the person support surface 104 are depicted. FIG. 4 depicts a cutaway side view of the person support surface 104 with the various internal components thereof assembled together. Referring to FIGS. 2-4, the person support surface 104 is positionable on a deck portion 200 (FIGS. 2 and 4) of the person support apparatus 102 (FIG. 4) (e.g., an advanced articulation person support apparatus), according to various aspects described herein.

Still referring to FIGS. 2-4, various internal components of the person support surface 104 (e.g., generally enclosed by the dashed line depicted in FIG. 2) may include a surface foundation layer 210 (FIG. 2), a turn assist bladder layer 220 (FIGS. 2 and 4), a working cushion layer 230 (FIGS. 2 and 4), support cushion layers 240A, 240B, 240C (FIGS. 2-4), a microclimate management (MCM) layer 250 (FIGS. 2 and 4), and/or a foot bladder layer 260 (FIGS. 2-4). In one aspect, the person support surface 104 may include the surface foundation layer 210, the turn assist bladder layer 220, the support cushion layer 240B, the MCM layer 250, and the foot bladder layer 260. In another aspect, the person support surface 104 may include the surface foundation layer 210, the turn assist bladder layer 220, the working cushion layer 230, the support cushion layer 240A, the MCM layer 250, and the foot bladder layer 260. In such aspects, each of the components may be "internal" with respect to the top encasement portion 106 and the bottom encasement portion 108, as described herein. That is, the components may be contained within the cavity defined by joining the top encasement portion 106 and the bottom encasement portion 108 with the interlocking device 110 (FIG. 1) as described herein.

Referring to FIG. 2, the deck portion 200 may include a head section 201, a seat section 203, a thigh section 205, and/or a foot section 207. Since the deck portion 200, as illustrated in FIG. 2, is associated with an advanced articulation person support apparatus, the head section 201, the seat section 203, the thigh section 205, and/or the foot section 207 are articulable relative to one another.

The surface foundation layer 210 may include a foundation base 212 (e.g., foam such as thigh foam), a subject right side bolster 214 (e.g., a first lateral side bolster, in the −x direction of the coordinate axes of FIG. 2), and a subject left side bolster 216 (e.g., a second lateral side bolster, in the +x direction of the coordinate axes of FIG. 2). The surface foundation layer 210 may extend longitudinally between a distal end (e.g., in the +z direction of the coordinate axes of FIG. 2) and a proximal end (e.g., in the −z direction of the coordinate axes of FIG. 2) along axes A-A as depicted in FIG. 2. The foundation base 212 may include one or more separable sections 213A, 213B that correspond to a gap(s) between adjacent sections of the deck portion 200 (e.g., gap 209A between the head section 201 and the seat section 203, gap 209B between the seat section 203 and the thigh section 205, and/or the like). In light of FIG. 2, the surface foundation layer 210 may extend between a proximal end (e.g., in the −z direction of the coordinate axes depicted in FIG. 2) of the head section 201 and a distal end (e.g., in the +z direction of the coordinate axes depicted in FIG. 2) of the thigh section 205. According to various aspects, the surface foundation layer 210 may be alternatively referred to herein as a crib (e.g., if made of foam, a foam crib, and/or the like) since it may restrain and/or provide structure to support various internal components of the person support surface 104 as described herein. According to various aspects, a first enclosure 211, a second enclosure 213, and a third enclosure 270 may be defined in the surface foundation layer 210. Such enclosures may house various air supply components (e.g., air valves, air manifolds, air control boards, blowers, compressors, and/or the like) as described herein.

The turn assist bladder layer 220, as depicted in FIG. 2, may be positionable above (e.g., in the +y direction of the coordinate axes of FIG. 2) the foundation base 212 of the surface foundation layer 210 and may be located between the subject right side bolster 214 and the subject left side bolster 216 of the surface foundation layer 210 (e.g., to restrain lateral movement and/or lateral expansion of the turn assist bladder layer 220). In some aspects, the turn assist bladder layer 220 may include a plurality of turn bladders 222 (e.g., collar turn bladders, or the like) oriented parallel to a plane (e.g., a y-z plane of the coordinate axes of FIG. 2) defined through the longitudinal axis A-A, as depicted in FIG. 2. In some aspects, each of the plurality of turn bladders 222 may be defined by a polyurethane coated impermeable heavy-duty fabric. According to various aspects, each of the plurality of turn bladders 222 may minimize volume given an inflated height thereof, and are controllable via high-flow valves to increase and/or improve turn angle and to reduce inflation and/or deflation time. As depicted in FIG. 2, the turn assist bladder layer 220 may include a head section turn bladder zone 225A and a seat section turn bladder zone 225B. The head section turn bladder zone 225A may include a subject head right side zone 224A and a subject head left side zone 224C. Similarly, the seat section turn bladder zone 225B may include a subject seat right side zone 224B and a subject seat left side zone 224D. The subject head right side zone 224A and the subject seat right side zone 224B, positioned on a first lateral side (e.g., in the −x direction of the coordinate axes of FIG. 2) of the plane (e.g., the y-z plane), may turn and/or roll the subject toward and/or on the subject's left side. Similarly, the subject head left side zone 224C and the subject seat left side zone 224D, positioned on a second lateral side (e.g., in the +x direction of the coordinate axes of FIG. 2) of the plane (e.g., the y-z plane), may turn and/or roll the subject toward and/or on the subject's right side. In some aspects, each of the subject head right side zone 224A, the subject seat right side zone 224B, the subject head left side zone 224C, and the subject seat left side zone 224D may include a single turn bladder. According to other aspects, each of the subject head right side zone 224A, the subject seat right side zone 224B, the subject head left side zone 224C, and the subject seat left side zone 224D may include more than one turn bladder. Each of the subject head right side zone 224A, the subject seat right side zone 224B, the subject head left side zone 224C, and the subject seat left side zone 224D may be controlled (e.g., inflated, deflated, and/or vented) independently (e.g., via supply tubes 226A, 226B, 226C, 226D, and/or the like, respectively). In a similar manner, according to other aspects, each turn bladder of the subject head right side zone 224A, the subject seat right side zone 224B, the subject head left side zone 224C, and the subject seat left side zone 224D may be controlled (e.g., inflated, deflated, and/or vented) independently (e.g., via independent supply tubes, not shown). According to various aspects, to turn and/or roll the subject toward and/or on the subject's left side, a control module may cause the subject head right side zone 224A and the subject seat right side zone 224B to inflate. Similarly, to turn and/or roll the subject toward and/or on the subject's right side, the control module may cause the subject head left side zone 224C and the subject seat left side zone 224D to inflate. The control module will be described in greater detail hereinbelow.

The working cushion layer 230 may be positionable above (e.g., in the +y direction of the coordinate axes of FIG. 2) the turn assist bladder layer 220 and may be located between the subject right side bolster 214 and the subject left side bolster 216 of the surface foundation layer 210 (e.g., to restrain lateral movement and/or lateral expansion of the working cushion layer 230). In some aspects, the working cushion layer 230 may include a plurality of working cushion bladders 232 oriented parallel to a plane (e.g., a y-z plane of the coordinate axes of FIG. 2) defined through the longitudinal axis A-A, as depicted in FIG. 2. In some aspects, each of the plurality of working cushion bladders 232 may be defined by a polyurethane coated impermeable heavy-duty fabric. As depicted in FIG. 2, the working cushion layer 230 may include a head section working cushion zone 235A and a seat section working cushion zone 235B. The head section working cushion zone 235A may include a subject head right side zone 234A and a subject head left side zone 234C. Similarly, the seat section working cushion zone 235B may include a subject seat right side zone 234B and a subject seat left side zone 234D. As depicted in FIG. 2, the subject head right side zone 234A and the subject seat right side zone 234B, positioned on a first lateral side (e.g., in the −x direction of the coordinate axes of FIG. 2) of the plane (e.g., the y-z plane), may assist to turn and/or roll the subject toward and/or on the subject's left side. Similarly, the subject head left side zone 234C and the subject seat left side zone 234D, positioned on a second lateral side (e.g., in the +x direction of the coordinate axes of FIG. 2) of the plane (e.g., the y-z plane), may assist to turn and/or roll the subject toward and/or on the subject's right side. In some aspects, each of the subject head right side zone 234A, the subject seat right side zone 234B, the subject head left side zone 234C, and the subject seat left side zone 234D may include a single working cushion bladder. According to other aspects, each of the subject head right side zone 234A, the subject seat right side zone 234B, the subject head left side zone 234C, and the subject seat left side zone 234D may include more than one working cushion bladder. Each of the subject head right side zone 234A, the subject seat right side zone 234B, the subject head left side zone 234C, and the subject seat left side zone 234D may be controlled (e.g., inflated, deflated, and/or vented) independently (e.g., via supply tubes 236A, 236B, 236C, 236D, and/or the like, respectively). In a similar manner, according to other aspects, each working cushion bladder of the subject head right side zone 234A, the subject seat right side zone 234B, the subject head left side zone 234C, and the subject seat left side zone 234D may be controlled (e.g., inflated, deflated, and/or vented) independently (e.g., via independent supply tubes, not shown).

According to various aspects described herein, each working cushion bladder of the subject head right side zone 234A, the subject seat right side zone 234B, the subject head left side zone 234C, and the subject seat left side zone 234D may maintain a predetermined or default level of inflation. According to various aspects, a control module may monitor the predetermined or default level of inflation. According to aspects described herein, to turn assist and/or roll the subject toward and/or on the subject's left side, the control module may cause the subject head left side zone 234C and the subject seat left side zone 234D to deflate (e.g., to vent within the person support surface 104 and ultimately flow out of a fluid outlet while causing the subject head right side zone 234A and the subject seat right side zone 234B to inflate (e.g., from the predetermined or default level of inflation). According to aspects of the present disclosure, deflation of the subject head left side zone 234C and the subject seat left side zone 234D combined with inflation of the subject head right side zone 234A and the subject seat right side zone 234B (e.g., coordinated with inflation of the subject head right side zone 224A and the subject seat right side zone 224B of the turn assist bladder layer 220 positioned below the working cushion layer 230) may realize an increased subject turn angle (e.g., up to about 30 degrees) relative to a person support surfaces without a plurality of working cushion bladders 232, without a need for a rotatable deck portion 200 (e.g., about axis A-A), and/or person support surfaces with a turn assist bladder layer 220 positioned above a working cushion layer 230. Similarly, to turn assist and/or roll the subject toward and/or on the subject's right side, the control module may cause the subject head right side zone 234A and the subject seat right side zone 234B to deflate (e.g., to vent within the person support surface 104 and ultimately flow out of a fluid outlet while causing the subject head left side zone 234C and the subject seat left side zone 234D to inflate (e.g., from the predetermined or default level of inflation). According to aspects of the present disclosure, deflation of the subject head right side zone 234A and the subject seat right side zone 234B combined with inflation of the subject head left side zone 234C and the subject seat left side zone 234D (e.g., coordinated with inflation of the subject head left side zone 224C and the subject seat left side zone 224D of the turn assist bladder layer 220 positioned below the working cushion layer 230) may realize an increased subject turn angle (e.g., up to and/or greater than about 30 degrees) relative to person support surfaces without a plurality of working cushion bladders 232, without a need for a rotatable deck portion 200 (e.g., about axis A-A), and/or person support surfaces with a turn assist bladder layer 220 positioned above a working cushion layer 230.

Still referring to FIG. 2, in one aspect, the support cushion layer 240A may be positionable above (e.g., in the +y direction of the coordinate axes of FIG. 2) the working cushion layer 230 and the turn assist bladder layer 220. In another aspect, the support cushion layer 240B may be positionable above (e.g., in the +y direction of the coordinate axes of FIG. 2) the working cushion layer 230 and the turn assist bladder layer 220. In yet another aspect, the support cushion layer 240B may be positionable above (e.g., in the +y direction of the coordinate axes of FIG. 2) the turn assist bladder layer 220.

As depicted in FIG. 4, the working cushion layer 230 and the turn assist bladder layer 220 may be disposed within the person support surface 104 with one or more substrate layers 294 (e.g., a head substrate layer 294*a* and/or a seat substrate layer 294*b*) disposed therebetween. In addition the one or more substrate layers 294 may also be disposed underneath (e.g., in the −y direction of the coordinate axes of FIG. 4) the foot bladder layer 260. The various substrate layers 294 may comprise a fabric layer or a polymer layer. In some aspects, the substrate layers 294 may comprise a coated, woven (e.g., non-tear), and/or non-stretch material.

Referring to FIGS. 2 and 3, support cushion layers 240A, 240B, 240C each include a plurality of bladders therein, including, but not limited to, a head isolation bladder 281 (in support cushion layer 240C), a plurality of head bladders 282 (in support cushion layer 240B), a plurality of seat bladders 283 (in support cushion layer 240A) oriented transverse to the longitudinal axis A-A of FIG. 2. In addition, the foot bladder layer 260 may include, but is not limited to, a first plurality of foot bladders 284 and/or a second plurality of foot bladders 285. In some aspects, each of the plurality of bladders 281, 282, 283, 284, 285 may be defined by a polyurethane coated impermeable heavy-duty fabric.

Referring particularly to FIG. 2, the various bladders 281, 282, 283, 284, 285 may each be included within a predefined sector, where the bladders of each predefined sector can be independently controlled relative to the bladders of the other predefined sectors, as described in greater detail herein. For example, the head isolation bladder 281 within support cushion layer 240C may be located within a first sector S1 (e.g., a first head sector), the plurality of head bladders 282 within support cushion layer 240B may be located within a second sector S2 (e.g., a second head sector), the plurality of seat bladders 283 within support cushion layer 240A may be located within a third sector S3 (e.g., a seat sector), and the first and second pluralities of foot bladders 284, 285 within the foot bladder layer 360 may be located within a fourth sector S4 (e.g., a foot sector). As particularly shown in FIG. 3, the various sectors may be arranged such that, when traversing the person support surface 104 from a proximal end (e.g., in the −z direction of the coordinate axes of FIG. 3) to a distal end (e.g., in the +z direction of the coordinate axes of FIG. 3), the first sector S1 is traversed first, followed by the second sector S2, the third sector S3, and the fourth sector S4.

While four predefined sectors are shown and described herein, the present disclosure is not limited to such. That is, in some aspects, the person support surface 104 may incorporate greater or fewer than four predefined sectors (e.g., two predefined sectors, three predefined sectors, four predefined sectors, six predefined sectors, seven predefined sectors, eight predefined sectors, or greater than eight predefined sectors). In addition, while FIG. 3 depicts each predefined sector S1-S4 as incorporating a particular grouping of bladders, the present disclosure is not limited to such. That is, each predefined sector S1-S4 may be altered (e.g., via a user utilizing the user interface 124 (FIG. 1)) to incorporate greater or fewer bladders. For example, should it be desired to increase the size of the first sector S1, a user may specify particular bladders within the second sector S2 as being part of sector S1 instead. As such, those particular bladders may be operated as being part of the first sector S1 instead of part of the second sector S2, as described in greater detail herein. This arrangement of sectors is merely illustrative, and other arrangements of sectors is contemplated and included within the scope of the present disclosure.

In some aspects, the head isolation bladder 281 is generally a single bladder that can be inflated, deflated, or vented (e.g., via supply tubes 288A, 288B depicted in FIG. 2) to raise or lower a subject's head, to provide a barrier that prevents the subject's head from extending off a proximal end of the person support surface 104 (e.g., in the −z direction of the coordinate axes of FIG. 3), and/or the like. The head isolation bladder 281 is located generally proximally from other bladders of the person support surface 104 (e.g., in the −z direction of the coordinate axes of FIG. 3). In some aspects, the head isolation bladder 281 may extend across substantially an entire width of the person support surface 104 (e.g., extend from a first lateral end in the +x direction to a second lateral end in the −x direction of the coordinate axes of FIG. 3). In other aspects, the head isolation bladder 281 may extend only across a portion of the width of the person support surface 104. While FIG. 3 only depicts a single head isolation bladder 281, the present disclosure is not limited to such. That is, in other aspects, a plurality of head isolation bladders may be included within the person support surface 104. In addition, while FIG. 3 depicts the head isolation bladder 281 within the first sector S1, the head isolation bladder 281 may be located in other sectors in other aspects.

The plurality of head bladders 282 may generally be located within the support cushion layer 240B. In some aspects, the plurality of head bladders 282 may generally be a plurality of separate groupings of bladders (e.g., "zones" of bladders) that can be inflated, deflated, or vented (e.g., via supply tubes 247A, 247B depicted in FIG. 2) independently of one another to raise or lower a subject's head and/or torso (depending on a positioning of the subject on the person support surface 104), to provide a steady pressure to a subject's head and/or torso, to provide various types of air therapies that involve change in pressure (e.g., CLRT, P&V, CLP, AP, ALP and/or the like), and/or the like. In some aspects, the separate groupings of bladders may be various sets of alternating air bladders including, but not limited to, a first set of alternating air bladders 282*a* and a second set of alternating air bladders 282*b*. The first set of alternating air bladders 282*a* and the second set of alternating air bladders 282*b* may be alternating in the sense that each bladder of a set is positioned next to at least one bladder of the other set, as shown in FIG. 3. That is, every other bladder of any subset of the plurality of head bladders 282 may be associated with a zone. While FIG. 3 depicts the first set of alternating air bladders 282*a* and the second set of alternating air bladders 282*b* in a "1-2" configuration whereby two sets of bladders alternate, the present disclosure is not limited to such. That is, other configurations using greater than two sets of alternating air bladders are also contemplated and included within the scope of the present disclosure. The various separate groupings of air bladders (e.g., the first set of alternating air bladders 282*a* and the second set of alternating air bladders 282*b*) may generally be fluidly detached from the various other groupings of bladders in some aspects. That is, the first set of alternating air bladders 282*a* may be fluidly separate from the second set of alternating air bladders 282*b* such that the air within each of the first set of alternating air bladders 282*a* and the second set of alternating air bladders 282*b* can be separately controlled to inflate, deflate, and vent the first set of alternating air bladders 282*a* and the second set of alternating air bladders 282*b* separately from one another.

The plurality of head bladders 282 may be oriented transverse to the longitudinal axis A-A depicted in FIG. 2. Still referring to FIG. 3, the plurality of head bladders 282 may be cylindrically and/or uniformly shaped. In some aspects, the plurality of head bladders 282 may not be encapsulated within a cover. In other aspects, the plurality of head bladders 282 may be encapsulated within a cover (e.g., shaped to retain the positional relationship between the plurality of head bladders 282).

The plurality of head bladders 282 are located between the head isolation bladder 281 and the plurality of seat bladders 283. In some aspects, each of the plurality of head bladders 282 may extend across substantially an entire width of the person support surface 104 (e.g., extend from a first lateral end in the −x direction to a second lateral end in the +x direction of the coordinate axes of FIG. 3). In other aspects, each of the plurality of head bladders 282 may extend only across a portion of the width of the person support surface 104. While FIG. 3 depicts seven (7) head bladders 282 arranged in a "1-2" alternating configuration, the present disclosure is not limited to such. That is, in other aspects, any other number and configuration of head bladders 282 may be included within the person support surface 104. In addition, while FIG. 3 depicts the plurality of head bladders 282 within the second sector S2, the plurality of head bladders 282 may be located in other sectors in other aspects.

The plurality of seat bladders 283 may generally be located within support cushion layer 240A. In some aspects, the plurality of seat bladders 283 may generally be a plurality of separate groupings of bladders (e.g., "zones" of bladders) that can be inflated, deflated, or vented (e.g., via supply tubes 246A, 246B depicted in FIG. 2) independently of one another to raise or lower a subject's torso and/or seat (depending on a positioning of the subject on the person support surface 104), to provide a steady pressure to a subject's torso and/or seat, to provide various types of air therapies that involve change in pressure (e.g., CLRT, P&V, CLP, AP, ALP and/or the like), and/or the like. In some aspects, the separate groupings of bladders may be various sets of alternating air bladders including, but not limited to, a first set of alternating air bladders 283*a* and a second set of alternating air bladders 283*b*. The first set of alternating air bladders 283*a* and the second set of alternating air bladders 283*b* may be alternating in the sense that each bladder of a set is positioned next to at least one bladder of the other set, as shown in FIG. 3. That is, every other bladder of any subset of the plurality of seat bladders 283 may be associated with a zone. While FIG. 3 depicts the first set of alternating air bladders 283*a* and the second set of alternating air bladders 283*b* in a "1-2" configuration whereby two sets of bladders alternate, the present disclosure is not limited to such. That is, other configurations using greater than two sets of alternating air bladders are also contemplated and included within the scope of the present disclosure. The various separate groupings of air bladders (e.g., the first set of alternating air bladders 283*a* and the second set of alternating air bladders 283*b*) may generally be fluidly detached from the various other groupings of bladders in some aspects. That is, the first set of alternating air bladders 283*a* may be fluidly separate from the second set of alternating air bladders 283*b* such that the air within each of the first set of alternating air bladders 283*a* and the second set of alternating air bladders 283*b* can be separately controlled to inflate, deflate, and vent the first set of alternating air bladders 283*a* and the second set of alternating air bladders 283*b* separately from one another.

The plurality of seat bladders 283 may be oriented transverse to the longitudinal axis A-A depicted in FIG. 2. Still referring to FIG. 3, the plurality of seat bladders 283 may be cylindrically and/or uniformly shaped. In some aspects, the plurality of seat bladders 283 may not be encapsulated within a cover. In other aspects, the plurality of seat bladders 283 may be encapsulated within a cover (e.g., shaped to retain the positional relationship between the plurality of seat bladders 283).

The plurality of seat bladders 283 are located between the plurality of head bladders 282 and the plurality of foot bladders 284. In some aspects, each of the plurality of seat bladders 283 may extend across substantially an entire width of the person support surface 104 (e.g., extend from a first lateral end in the −x direction to a second lateral end in the +x direction of the coordinate axes of FIG. 3). In other aspects, each of the plurality of seat bladders 283 may extend only across a portion of the width of the person support surface 104. While FIG. 3 depicts eight (8) seat bladders 283 arranged in a "1-2" alternating configuration, the present disclosure is not limited to such. That is, in other aspects, any other number and configuration of seat bladders 283 may be included within the person support surface 104. In addition, while FIG. 3 depicts the plurality of seat bladders 283 within the third sector S3, the plurality of seat bladders 283 may be located in other sectors in other aspects.

As noted herein, the foot bladder layer 260 may include a first plurality of foot bladders 284 and a second plurality of foot bladders 285. The foot bladders 284, 285 may be oriented to expand and/or collapse vertically (e.g., in the +y and/or −y directions of the coordinate axes of FIGS. 2-3). However, in some aspects, certain ones of the foot bladders 284, 285 may be oriented to expand and/or collapse horizontally (e.g., in the +z and/or −z directions of the coordinate axes of FIGS. 2-3). In an expanded state, the foot bladders 284, 285 realize a first height "H1" above (e.g., in the +y direction of the coordinate axes of FIG. 2) the foot section 207 of the deck portion 200 between a proximal end (e.g., in the −z direction of the coordinate axes of FIG. 2) and a distal end (e.g., in the +z direction of the coordinate axes of FIG. 2) of the foot bladder layer 260. In some aspects, as depicted in FIG. 2, the first height "H1" may be a uniform height between the proximal end and the distal end of the foot bladder layer 260. According to other aspects, the foot bladder layer 260 may include a non-uniform height between the proximal end and the distal end of the foot bladder layer 260 (e.g., between a first height "H1" at the proximal end and a second height (not shown) at the distal end of the foot bladder layer 260). Similar to as described herein, each bladder of the first plurality of foot bladders 284 and the second plurality of foot bladders 285 may be defined by a polyurethane coated impermeable heavy-duty fabric.

In some aspects, the plurality of foot bladders 284 may generally be a plurality of separate groupings of bladders (e.g., "zones" of bladders) that can be inflated, deflated, or vented independently of one another to raise or lower a subject's seat, legs, and/or feet (depending on a positioning of the subject on the person support surface 104), to provide a steady pressure to a subject's seat, legs, and/or feet, to provide various types of air therapies that involve change in pressure (e.g., CLRT, P&V, CLP, AP, ALP and/or the like), and/or the like (e.g., via supply tubes 266A, 266B, 266C). In some aspects, the separate groupings of bladders may be various sets of alternating air bladders including, but not limited to, a first set of alternating air bladders **284*a* and a second set of alternating air bladders 284*b*. The first set of alternating air bladders 284*a* and the second set of alternating air bladders 284*b* may be alternating in the sense that each pair of bladders of a set is positioned next to at least one other pair of bladders of the other set, as shown in FIG. 3. That is, every other bladder of any subset of the plurality of foot bladders 284 may be associated with a zone. While FIG. 3 depicts the first set of alternating air bladders 284*a* and the second set of alternating air bladders 284*b* in a "1,1-2,2" configuration whereby two sets of bladders alternate in pairs, the present disclosure is not limited to such. That is, other configurations using greater than two sets of alternating air bladders are also contemplated and included within the scope of the present disclosure. The various separate groupings of air bladders (e.g., the first set of alternating air bladders 284*a* and the second set of alternating air bladders 284*b*) may generally be fluidly detached from the various other groupings of bladders in some aspects. That is, the first set of alternating air bladders 284*a* may be fluidly separate from the second set of alternating air bladders 284*b* such that the air within each of the first set of alternating air bladders 284*a* and the second set of alternating air bladders 284*b* can be separately controlled to inflate, deflate, and vent the first set of alternating air bladders 284*a* and the second set of alternating air bladders 284*b*** separately from one another.

The plurality of foot bladders 284 may be oriented transverse to the longitudinal axis A-A depicted in FIG. 2. Still referring to FIG. 3, the plurality of foot bladders 284 may be cylindrically and/or uniformly shaped. In some aspects, the plurality of foot bladders 284 may not be encapsulated within a cover. In other aspects, the plurality of foot bladders 284 may be encapsulated within a cover (e.g., shaped to retain the positional relationship between the plurality of foot bladders 284).

The plurality of foot bladders 284 are located distally (e.g., in the +z direction of the coordinate axes of FIG. 3) from the plurality of seat bladders 283. In some aspects, each of the plurality of foot bladders 284 may extend across substantially an entire width of the person support surface 104 (e.g., extend from a first lateral end in the −x direction to a second lateral end in the +x direction of the coordinate axes of FIG. 3). In other aspects, each of the plurality of foot bladders 284 may extend only across a portion of the width of the person support surface 104. While FIG. 3 depicts eight (8) pairs of foot bladders 284 (with sixteen (16) bladders total) arranged in a "1,1-2,2" alternating configuration, the present disclosure is not limited to such. That is, in other aspects, any other number and configuration of foot bladders 284 may be included within the person support surface 104. In addition, while FIG. 3 depicts the plurality of foot bladders 284, 285 within the fourth sector S4, the plurality of foot bladders 284 may be located in other sectors in other aspects.

The second plurality of foot bladders 285 may generally be arranged underneath the plurality of foot bladders 284 (e.g., in a direction downwards along the Y-axis of the coordinate axes of FIG. 3). The second plurality of foot bladders 285 may incorporate one or more articulating hinges or the like for arranging a generally tubular shaped bladder in a particular configuration, such as the diamond configuration depicted in FIG. 3. The second plurality of foot bladders 285 can be inflated, deflated, or vented to raise or lower a subject's feet, to provide a barrier that prevents the subject's feet from extending off a distal end of the person support surface 104 (e.g., in the +z direction of the coordinate axes of FIG. 3), and/or the like. The second plurality of foot bladders 285 are located generally distally from other bladders of the person support surface 104 (e.g., in the +z direction of the coordinate axes of FIG. 3) in addition to being underneath the plurality of foot bladders 284. In some aspects, the second plurality of foot bladders 285 may extend across substantially an entire width of the person support surface 104 (e.g., extend from a first lateral end in the −x direction to a second lateral end in the +x direction of the coordinate axes of FIG. 3). In other aspects, the second plurality of foot bladders 285 may extend only across a portion of the width of the person support surface 104.

In some aspects, an enclosure 273 may be defined in the foot bladder layer 260 (e.g., depicted in phantom as optional). In one aspect, the enclosure 273 may be positioned centrally (e.g., vertically, laterally, and/or longitudinally) within the foot bladder layer 260. Such an enclosure 273 may house various air supply components (e.g., air valves, air manifolds, air control boards, blowers, compressors, and/or the like) as described herein. In one aspect, for example, the enclosure 273 may house components including an alternating air manifold (not shown) and an alternating air control board (not shown) that provide a continuous low pressure (CLP), an alternating pressure (AP), and/or an alternating low pressure (ALP) functionality, as described herein. In another aspect, for example, the enclosure 273 may house components including an air supply (e.g., a blower and a blower control board, a compressor, a compressor control board, and/or the like) to supply a cooling fluid to the MCM layer 250, as described herein. In yet a further aspect, for example, the enclosure 273 may house an air supply without a separate control board.

While the terms "head bladder," "seat bladder," and "foot bladder" are used herein, it should be understood that such terms are merely descriptors to distinguish the general location of certain bladders from other bladders. Accordingly, the term "bladder" may be used herein encompass any of the various bladders described herein, including, but not limited to the head bladders, the seat bladders, and the foot bladders.

While particular shapes have been described hereinabove, it should be understood that the various bladders described herein with respect to FIGS. 2-3 may have any shape and/or size without departing from the present disclosure. For example, as noted hereinabove, some various air bladders may be generally tubular in shape (e.g., having a circular or oval cross section). In addition, the various bladders may be arranged into particular configurations. For example, one or more bladders may be arranged relative to one another via articulating hinges in a particular configuration whereby the one or more bladders are positioned to define voids or the like. Illustrative configurations of the one or more bladders are also contemplated, including, but not limited to, diamond shaped configurations that result in diamond shaped voids, triangular shaped configurations that result in one or more triangular shaped voids, quadrilateral shaped configurations that result on one or more quadrilateral shaped voids, and/or the like. The voids may have a similar shape and/or size, or may have different shapes and/or sizes. Further, the locations of the voids are not limited by the present disclosure.

The MCM layer 250 may be positionable above (e.g;., in the +y direction of the coordinate axes of FIG. 2) the support cushion layers 240A, 240B. In some aspects, the MCM layer 250 may be located between the subject right side bolster 214 and the subject left side bolster 216 of the surface foundation layer 210. In other aspects, the MCM layer 250 is positionable above and/or covers (e.g., in the +y direction of the coordinate axes of FIG. 2) the surface foundation layer 210 (e.g., including the subject right side bolster 214 and the subject left side bolster 216), the turn assist bladder layer 220, the working cushion layer 230, the support cushion layer 240A, 240B, and/or the foot bladder layer 260, as described herein.

According to aspects of the present disclosure, the risk of a subject developing a pressure injury can be reduced by controlling the microclimate (e.g., parameters such as temperature) in the immediate vicinity of the subject's body. In particular, the risk of a pressure injury can be reduced by cooling susceptible portions of the subject's body. Such an MCM layer 250 may reduce a risk of the subject in developing a pressure injury in areas that correspond to the seat section 106B (FIG. 1). More specifically, aspects of the present disclosure utilize an air source integrated within the person support surface 104 itself to provide targeted and/or focused microclimate management to the seat section 106B (FIG. 1).

Turning to FIG. 4, the person support surface 104 may also include various other components therein. For example, a percussion and vibration (P&V) element 290 may be generally disposed between the plurality of head bladders 282 and the MCM layer 250 in some aspects. That is, the P&V element 290 may be disposed above (e.g., in the +y direction of the coordinate axes of FIG. 4) the plurality of head bladders 282 and beneath (e.g., in the −y direction of the coordinate axes of FIG. 4) the MCM layer 250.

Also depicted in FIG. 4 is a containment box for various air control components, as described in greater detail herein (e.g., an ACB box 292). In the aspect depicted in FIG. 4, the ACB box 292 is generally located proximally (e.g., in the −z direction of the coordinate axes of FIG. 4) relative to the turn assist bladder layer 220.

Figure 5:
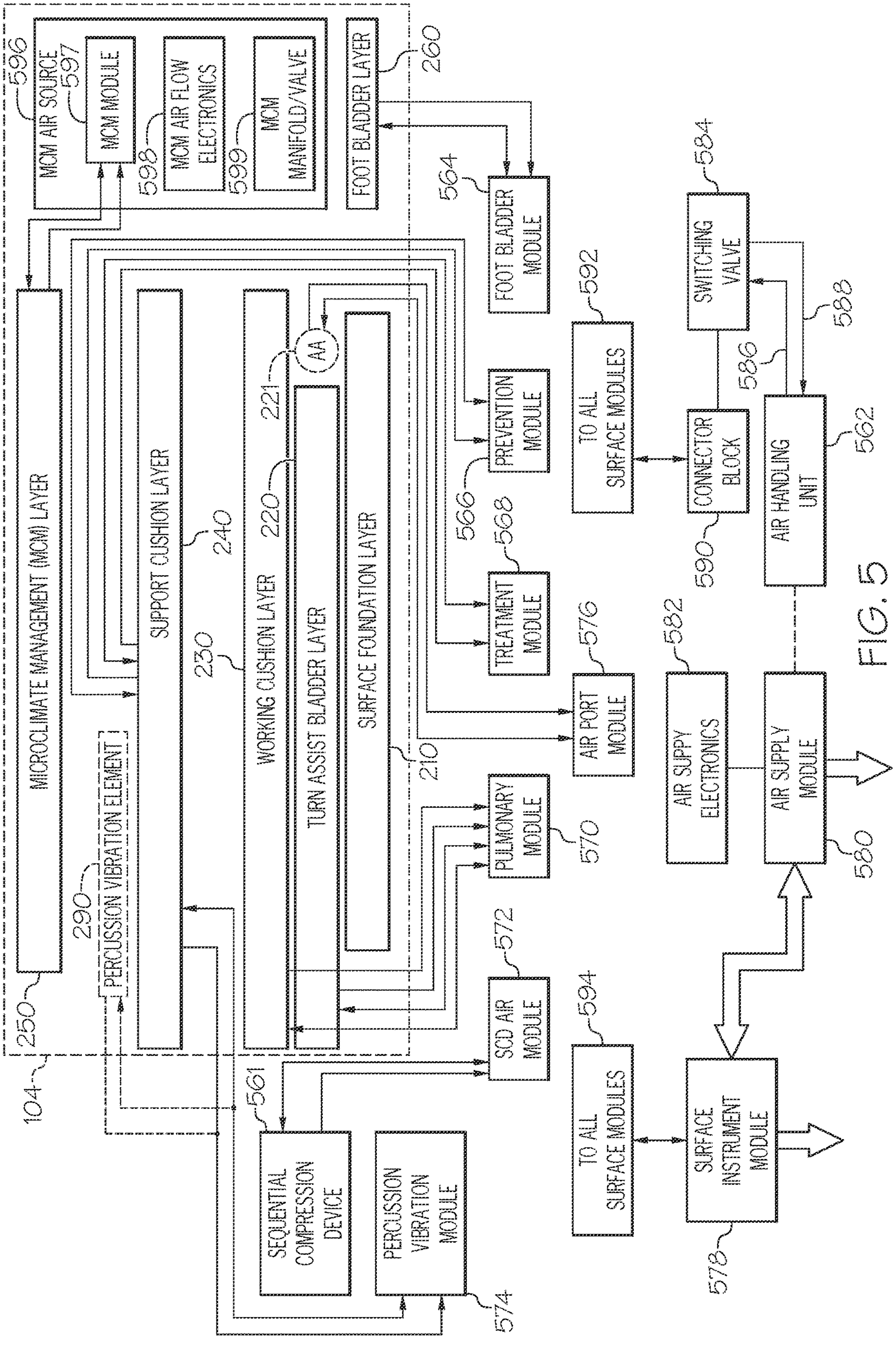
FIG. 5 schematically depicts a block diagram of illustrative control modules associated with the person support surface of the person support apparatus of FIG. 1 according to one or more aspects shown and described herein.

FIG. 5 schematically depicts a block diagram of illustrative control modules associated with the person support surface 104 of the person support apparatus 102 of FIG. 1, according to various aspects described herein. Referring to FIG. 5, the person support surface 104 of the present disclosure permits the various support layers and therapy devices described with respect to FIGS. 2-4 to be driven by at least one external fluid (e.g., air) source such that the at least one external fluid source controls each of the sectors S1-S4 (FIGS. 3-4) independently of one another, and the microclimate management layer to be driven by a fluid (e.g., air) source integrated within the person support surface 104. As described herein, the person support surface 104 may include the surface foundation layer 210, the turn assist bladder layer 220, the working cushion layer 230, the support cushion layers 240 (e.g., 240A, 240B, 240C as depicted in FIGS. 2-4), the MCM layer 250 and/or the foot bladder layer 260. In some aspects, the person support surface 104 may further comprise the at least one percussion vibration bladder 292 of the P&V element 290 (FIG. 4) and/or the advanced articulation (AA) bladder 221 (each depicted in phantom as optional). A sequential compression device 561 for venous compression therapy of a subject is also provided.

A plurality of separate treatment/therapy and surface control modules are provided for interconnecting the various treatment/therapy devices and surface layers to a communication network associated with the person support apparatus 102 (FIG. 1) and its on-board air handling unit 562. In particular, aspects of the present disclosure include a foot bladder control module 564, a decubitus prevention control module 566, and a decubitus treatment control module 568. Further modules include a pulmonary rotation control module 570, a sequential compression device air control module 572, and a pulmonary percussion and vibration control module 574. An auxiliary air-port control module 576 is also provided. The air-port control module 576 may provide for an auxiliary air output for manual filling of auxiliary bladder systems for positioning, safety barriers, clinical treatments such as burn contractures, and other purposes. In some aspects, the air-port control module 576 may provide for auxiliary air output to the advanced articulation (AA) bladder 221. It should be understood that each of the control modules may be included or positioned within the envelope of the person support surface 104 depicted in FIG. 5 (e.g., pneumatic aspects within enclosures such as pneumatic air control boxes, electrical aspects within enclosures such as electrical air control boxes, pneumatic and/or electrical aspects within enclosures, or the like, as described herein).

Each of the modules is designed to physically and functionally connect the various bladders and treatment devices to both the communication network of the person support apparatus 102 through a surface instrument module 578 and to the air handling unit 562 which may be controlled by an air supply module 580. The air supply module 580 may be coupled to the communication network (e.g., peer-to-peer). Air supply electronics 582 may be connected to the air supply module 580 for controlling the air handling unit 562 and switching valve 584 based on network commands for controlling the various surface and treatment modules illustrated in FIG. 5.

The air handling unit 562 may supply air under pressure to the switching valve 584 on supply tube 586. The air handling unit 562 may also apply a vacuum to the switching valve 584 through supply tube 588. An output of the switching valve 584 is coupled to a connector block 590. The connector block 590 may provide an air and a vacuum supply tube (not shown) to each of the surface control and treatment control modules as illustrated in block 592 of FIG. 5. It should be understood that dual control lines for both air and vacuum may be supplied to each of the surface control and treatment control modules of FIG. 5. Such a dual control may allow each module to apply pressure and vacuum simultaneously to different zones of a bladder or treatment device.

The surface instrument module 578, which is also coupled to the communication network, is electrically coupled to each of the surface control modules and treatment control modules as illustrated in block 594 of FIG. 5. This network connection may permit all the modules to receive input commands from other network modules and/or to output information to other network modules via the communication network.

Referring still to FIG. 5, the person support surface 104 of the present disclosure may include an integrated MCM air source 596. According to various aspects, the integrated MCM air source 596 may include an MCM control module 597, MCM air flow electronics 598, and/or an MCM air manifold and/or valve 599 to control the air flow rate and/or pressure through the MCM layer 250 in a manner similar to the other control modules (e.g., control modules 564-576) as described herein. As an air source integrated within the person support surface 104, the MCM air source 596 may target high-flow, low-pressure air to desired portions (e.g., MCM layer 250) of the person support surface 104 without relying on and/or drawing from an external air source (e.g., air source associated with a person support apparatus 102). According to aspects described herein, an external air source may include an air supply (not shown, e.g., usable for percussion and vibration therapies) coupled to a frame of the person support apparatus 102 and/or a pump (not shown, e.g., usable for subject support, turn-assist and CLRT functionalities as described herein) coupled to the frame of the person support apparatus 102. Accordingly, the integrated MCM air source 596 of the present disclosure further enables interchangeability between multiple person support apparatuses without requiring customization for each person support apparatus. Furthermore, the integrated MCM air source 596 of the present disclosure reduces and/or eliminates deficiencies introduced by an external air source. According to various aspects, the integrated MCM air source 596 provides an air source dedicated to MCM. In particular, the MCM control module 597 of the present disclosure may optimize flow rate at a desired interface pressure to realize maximum skin cooling. This is an improvement over a person support surface that taps into an external air source taxed with supplying air for other functionalities (e.g., P&V, turn assist, CLRT, AP ALP, CLP, or the like as described herein).

Figure 6:
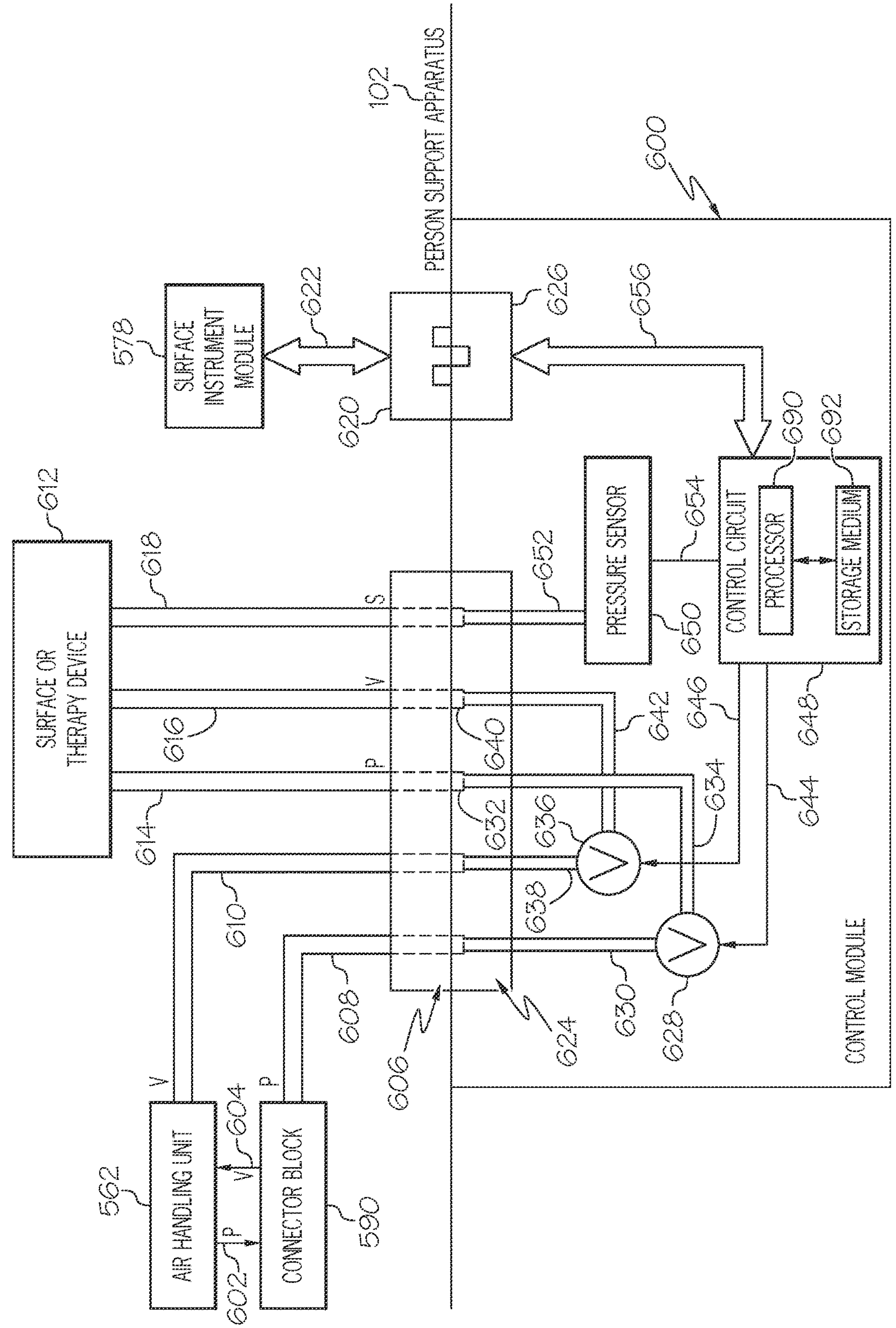
FIG. 6 schematically depicts a block diagram of an illustrative therapy or support surface control module associated with the person support surface of the person support apparatus of FIG. 1 according to one or more aspects shown and described herein.

FIG. 6 schematically depicts a block diagram of an illustrative therapy or support surface control module 600 associated with the person support surface 104 of a person support apparatus 102 of FIG. 1, according to various aspects described herein. It should be understood that the details of the foot bladder control module 564, the decubitus prevention control module 566, the decubitus treatment control module 568, the pulmonary rotation control module 570, the SCD air control module 572, the pulmonary percussion and vibration control module 574, the air-port control module 576, and/or the MCM control module 597 may include the same and/or similar structural components as the therapy or support surface control module 600 illustrated in FIG. 6.

Referring to FIG. 6, the air handling unit 562 may be coupled directly to the connector block 590 by both an air pressure supply tube 602 and a vacuum supply tube 604. In some aspects, as discussed herein, tubes 602 and 604 from the air handling unit 562 may be coupled to a switching valve 584 and only a single pressure/vacuum tube may be coupled to the connector block 590 as illustrated in FIG. 5.

Referring still to FIG. 6, the connector block 590 may be coupled to a module connector 606 located on the person support apparatus 102 (FIG. 1). In particular, the connector block 590 may be coupled to the module connector 606 by a pressure supply tube 608 and a vacuum supply tube 610. It should be understood that, in some aspects, a single supply line for both pressure and vacuum could also be used.

The module connector 606 may also be coupled to one of the surface or therapy devices 612 by a pressure supply tube 614, a vacuum supply tube 616, and/or a sensor supply tube 618. Depending upon the particular surface or therapy device, more than one pressure, vacuum, and/or sensor tubes may be connected between the module connector 606 and the surface or therapy device 612. For example, each separate air zone of the surface or therapy device may have its own pressure, vacuum, and/or sensor tubes. For illustration purposes, however, only a single set of supply tubes will be discussed.

The person support apparatus 102 may also include an electrical connector 620 coupled to the surface instrument module 578 of the communication network of the person support apparatus 102 by suitable cable 622. The therapy or support surface control module 600 illustrated in FIG. 6 may be designed to facilitate a coupling of the therapy or support surface control module 600 to the person support apparatus 102. Each of the surface and treatment options illustrated in FIG. 6 may be provided in the person support apparatus 102 with a pneumatic connector such as module connector 606 and a connector such as electrical connector 620 provided for each of the surface and therapy devices. The therapy or support surface control module 600 may be easily installed by coupling the module connector 606 on the person support apparatus 102 to a mating connector 624 of the therapy or support surface control module 600. In addition, a mating electrical connector 626 may be provided on the therapy or support surface control module 600 for coupling to electrical connector 620 on the person support apparatus 102 (FIG. 1). The configuration of the therapy or support surface control module 600 may permit a simple "slide in" connection to be used to install the therapy or support surface control module 600 and activate the surface of therapy device 612.

An air pressure input from pneumatic mating connector 624 may be coupled to an electrically controlled valve 628 by line 630. An output of the valve 628 may be coupled to a pressure output port 632 by line 634. Pressure output port 632 may be coupled to the surface or therapy device 612 by the pressure supply tube 614.

The vacuum supply tube 610 from the connector block 590 may be coupled to an electrically controlled valve 636 by line 638 of the therapy or support surface control module 600. An output of valve 636 may be coupled to a vacuum port 640 of mating connector 624 by line 642. The vacuum port 640 may be coupled to the surface or therapy device 612 by the vacuum supply tube 616. The electrically controlled valves 628 and 636 may be controlled by output signals on lines 644 and 646, respectively, from a control circuit 648 of the therapy or support surface control module 600. The control circuit 648 may include processor 690 (e.g., a microprocessor or other controller) for selectively opening and closing the valves 628 and 636 to control the surface or therapy device 612. In addition, the control circuit 648 may further be adapted for directing operation of one or more air supplies (e.g., blowers, compressors, and/or the like), either by directly transmitting signals or indirectly via one or more other components described herein. The control circuit 648 may also include or may be communicatively coupled to a non-transitory, processor-readable storage medium 692 (e.g., memory), which includes one or more programming instructions thereon for carrying out various control operations in accordance with the present disclosure. For example, the control circuit 648 may be particularly adapted for carrying out the processes described herein with respect to FIG. 9 either alone or in conjunction with the various other components of the control module 600.

Still referring to FIG. 6, it should be understood that several valves may be used for each surface or treatment device. For instance, the support cushion layer 640 may have a plurality of different air zones which are independently controlled. In this instance, separate pressure, vacuum and/or sensor lines may be coupled to each zone. A electrically controlled valve may be provided for each pressure and/or vacuum line in each zone to provide independent controls for each zone.

The therapy or support surface control module 600 may also include a pressure sensor 650 (e.g., a pressure transducer). The pressure sensor 650 may be coupled to sensor supply tube 618 by line 652. The pressure sensor 650 may generate an output signal indicative of the pressure in the particular zone of the surface or therapy device 612. This output signal from the pressure sensor 650 may be coupled to the control circuit 648 by line 654.

The control circuit 648 may also be coupled to the electrical connector 626 by a suitable connection 656 to couple the control circuit 648 of the therapy or support surface control module 600 to the surface instrument module 578. Therefore, the control circuit 648 may receive instructions from the other modules coupled to the communications network. The control circuit 648 may also output information related to the particular surface or therapy device 612 to the communications network. Specifically, a graphical interactive display (FIG. 1, user interface 124) may be coupled to the communication network for transmitting command signals for the plurality of air therapy devices over the communication network to control operation of the plurality of air therapy devices, as described in greater detail herein. The graphical interactive display may include a display for a user (e.g., subject, caregiver, or the like) input. Each control module (FIG. 5) may transmit display commands to the display related to the corresponding air therapy device. The display commands from each control module may provide a menu driven list of options to the display to permit user selection/input of control options for the plurality of air therapy devices.

A plurality of person support surfaces including a plurality of combinations and subcombinations of internal components and/or functionalities are described herein. At the outset, is should be understood that the present disclosure should not be limited to any particularly described person support surface and/or any combination or subcombination of internal components and/or functionalities. Accordingly, it is envisioned that a person support surface of the present disclosure may include all, less than all, or any subset of, the internal components and/or functionalities described herein.

Person Support Surface—Alternating Low Pressure Feature

Figure 7A:
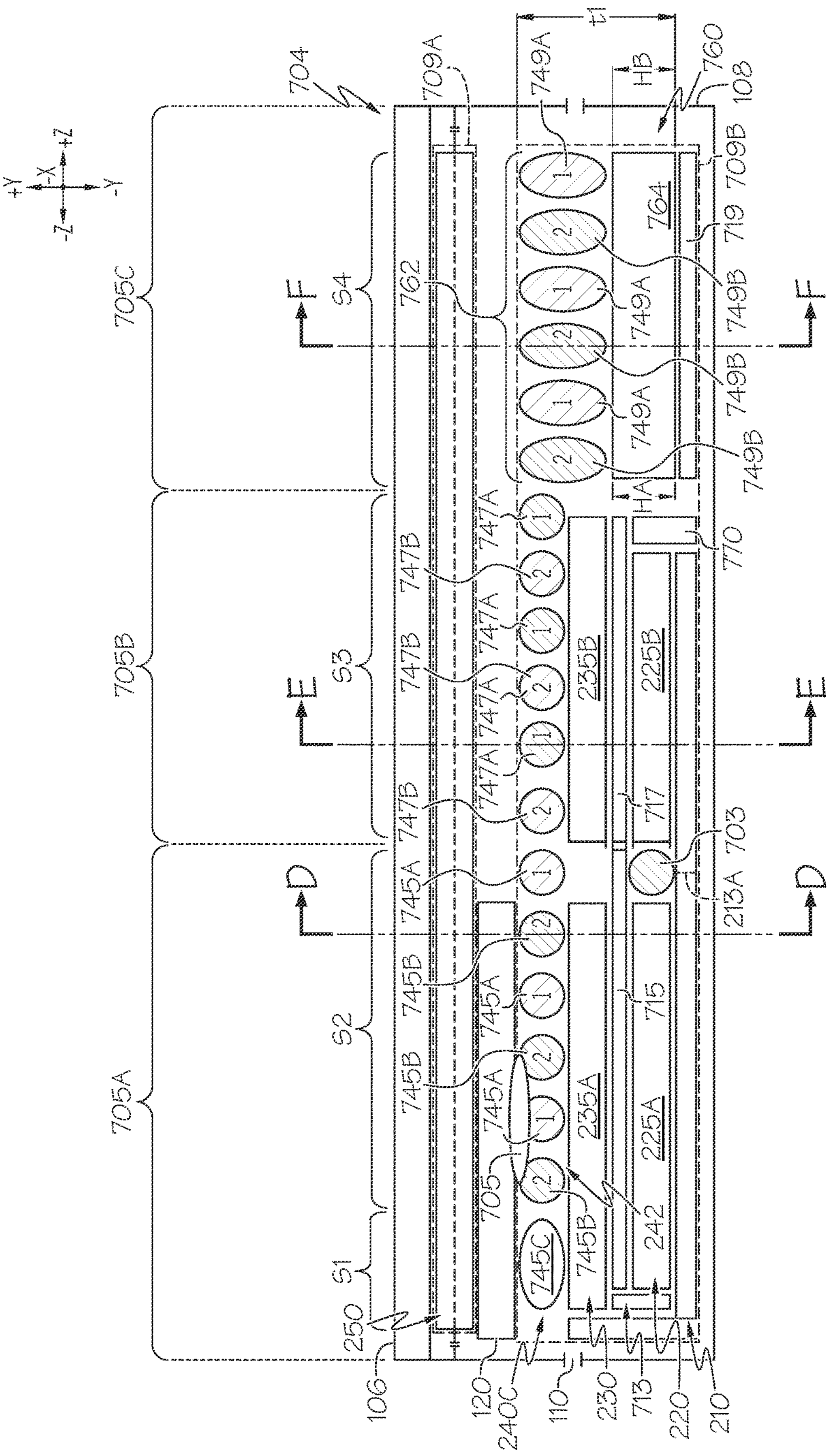
FIG. 7A depicts a cross-sectional side view, along axis A-A of FIG. 2, of an illustrative person support surface according to one or more aspects shown and described herein.

FIG. 7A depicts a cross-sectional view, along axis A-A of FIG. 3, of an illustrative person support surface 704, according to various aspects described herein. While FIG. 7A is numbered using different component identifiers than the component identifiers used herein with respect to the aspects depicted in FIGS. 1-6, it should be understood that the various components depicted in FIG. 7A may be the same or different from the components discussed with respect to the aspects of FIGS. 1-6. That is, the various aspects described and depicted in FIG. 7A are intended to be combinable with the aspects described and depicted with respect to FIGS. 1-6 unless explicitly stated otherwise.

Referring to FIG. 7A, the person support surface 704 may include a top encasement portion 106 coupled, via an interlocking device 110 (e.g., zipper or the like), to a bottom encasement portion 108. The person support surface 704 may house various internal components including, but not limited to, a surface foundation layer 210 (e.g., a foam crib), a turn assist bladder layer 220, a working cushion layer 230, a support cushion layer 240C, and a MCM layer 250, as described herein. The person support surface 704 may further house an air supply (e.g., pneumatic) enclosure 770 that supplies air to the MCM layer 250, as described herein. Furthermore, similar to FIG. 1, the person support surface 704 of FIG. 7A depicts a head section sleeve 120 (e.g., X-ray sleeve) illustratively positioned between the support cushion layer 240C and the MCM layer 250.

The turn assist bladder layer 220 may include a head section turn bladder zone 225A and a seat section turn bladder zone 225B and the working cushion layer 230 may include a head section working cushion zone 235A and a seat section working cushion zone 235B. In addition, as described herein, the support cushion layers 240A-240C may include a plurality of sectors S1-S3 and the foot bladder layer 260 may include a fourth sector S4, where the zones of each sector are operable independently of the zones of other sectors such that the various air therapies (e.g., CLP, AP, ALP, etc.) provided by the zones can be turned off on a sector-by-sector basis. According to various aspects described herein, such zone separation may permit use on subjects that may only need air therapy such as CLP, AP, ALP, or the like in a particular area to only receive such therapy in sectors corresponding to those areas, thereby reducing, avoiding, or eliminating issues such as discomfort, motion sickness, or the like. For example, a subject may receive air therapy such as CLP, AP, ALP, or the like in the fourth sector S4 (e.g., a sector containing a plurality of zones of bladders in the foot bladder layer 260) while no therapy is provided in the remaining sectors S1-S3 (e.g., sectors each containing a plurality of zones of bladders in the support cushion layers 240A-240C).

The person support surface 704 of FIG. 7A, according to some aspects, may further include the foot bladder layer 260 of FIG. 2. However, in other aspects, the person support surface 704 may include a foot bladder layer 760, as depicted in FIG. 7A. The foot bladder layer 760 may include a plurality of foot bladders 762 positioned over (e.g., in the +y direction of the coordinate axes of FIG. 7A) a foot support layer 764. As depicted in FIG. 7A, a thickness "t1"

of the foot bladder layer 760 may correspond to a combination of the support cushion layer 240C, the working cushion layer 230, the turn assist bladder layer 220, and either a head substrate layer 715 or a seat substrate layer 717, as described herein. In some aspects, the foot support layer 764 may minimize a volume of air required by the plurality of foot bladders 762 to function as described herein. In some aspects, the foot support layer 764 may include a foot support bladder that maintains a default inflation state to fill volume within the foot section 705C of the person support surface 704. Accordingly, the foot support layer 764 may be controlled (e.g., inflated, deflated, and/or vented) as needed (e.g., with respect to positional changes of the person support apparatus, to chair egress, and/or the like). Further, as depicted in FIG. 7A, a foot substrate layer 719 may be positioned under (e.g., in the −y direction of the coordinate axes of FIG. 7A) the foot support layer 764, as described herein. In some aspects, the foot support layer 764 may be a consistent height (e.g., HA=HB) between a proximal end (e.g., in the −z direction of the coordinate axes of FIG. 7A) and a distal end (e.g., in the +z direction of the coordinate axes of FIG. 7A). However, according to some aspects, to realize a gradual downward slope, the foot support layer 764 itself may be defined by a first height (e.g., HA) at its proximal end and a second height (e.g., HB) at its distal end (e.g., the first height HA being greater than the second height HB) and the plurality of foot bladders 762 may be a consistent height. In other aspects, the foot support layer 764 (e.g., HA>HB) and the plurality of foot bladders 762 (e.g., series of incrementally shorter and/or stair-stepped heights) may realize a gradual downward slope.

A head section 705A of the person support surface 704 may include one or more enclosures. For example, a first enclosure (not shown, similar to the first enclosure 211 of FIG. 2) may be positioned in a first lateral corner (e.g., in the −z and +x directions of the coordinate axes of FIG. 7A) and a second enclosure 713 may be positioned in a second lateral corner (e.g., in the −z and −x directions of the coordinate axes of FIG. 7A). According to various aspects, the first enclosure and the second enclosure 713 may be defined in the surface foundation layer 210. In some aspects, the first enclosure (e.g., pneumatic air control box) may house air valves and/or air manifolds and the second enclosure 713 (e.g., electrical air control box) may house an air control board. In such aspects, the air control board of the second enclosure 713 may be configured to control the air valves and/or air manifolds of the first enclosure to distribute air (e.g., air from an external source(s)) to the plurality of bladders and/or air bladders as discussed herein (e.g., for turn-assist, CLRT, P&V, and/or the like). Positioning the first enclosure in the first lateral corner and the second enclosure 713 in the second lateral corner may further define the radiolucent window, as discussed elsewhere herein, over an otherwise centrally positioned enclosure that houses the air valves, air manifold, and/or air control board.

Figure 7B:
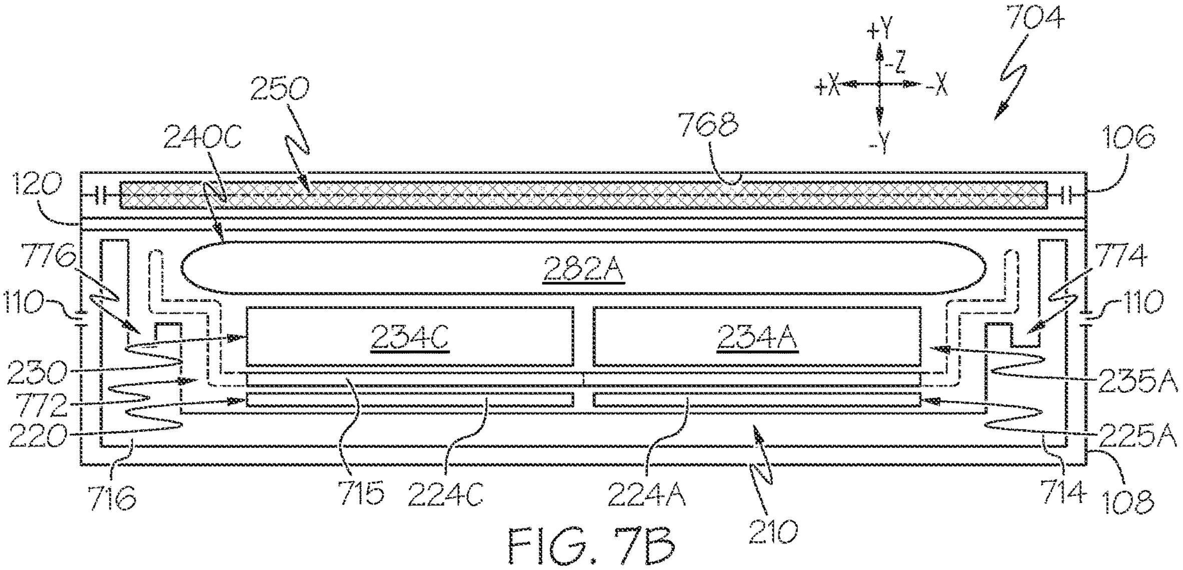
FIG. 7B depicts a cross-sectional side view, along axis D-D of FIG. 7A, of the person support surface according to one or more aspects shown and described herein.

The person support surface 704 may include an advanced articulation bladder 703 (e.g., an advanced articulation bladder layer). According to various aspects, the advanced articulation bladder 703 may be positioned to interface with a gap 209A of a deck portion 200 of an advanced articulation person support apparatus 102 (FIG. 2). In particular, the advanced articulation bladder 703 may be positioned to interface with (e.g., above) and/or expand into at least one separable section of the surface foundation layer 210 (e.g., separable section 213A) that corresponds to the gap 209A of the deck portion 200. In some aspects, the advanced articulation bladder 703 may be positioned at a distal portion (e.g., in the +z direction of the coordinate axes of FIG. 7A) of the head section 705A. In other aspects, the advanced articulation bladder 703 may be positioned between the head section 705A and the seat section 705B. In such aspects, the advanced articulation bladder 703 may extend between a first lateral side (e.g., in the −x direction of the coordinate axes of FIG. 7A) and a second lateral side (e.g., in the +x direction of the coordinate axes of FIG. 7A) to fill the gap 209A. In some aspects, the advanced articulation bladder 703 may extend between the subject right side bolster 714 and the subject left side bolster 716 (FIG. 7B). According to various aspects, the advanced articulation bladder 703 may be deflated and/or partially inflated when the person support surface 704 is in a flat position (e.g., when the gap 209A is minimized). In such aspects, as depicted in FIG. 7A, the advanced articulation bladder 703 may not interface with and/or expand into the separable section 213A to fill any gap 209A. However, as the person support surface 704 is repositioned (e.g., toward a raised head section 705A position, toward a chair egress position, and/or the like) the advanced articulation bladder 703 may be progressively inflated to interface with and/or expand into a progressively dividing separable section 213A to fill an increasing gap 209A. Filling such a gap 209A may be pertinent to an advanced articulation person support apparatus (e.g., where the head section 201 and/or the seat section 203 of the deck portion 200 may translate relative to one another during repositioning and form the gap 209A). In some aspects, the bottom encasement portion 108 may define a relief portion (not shown) into which the advanced articulation bladder 703 may expand when inflated. According to some aspects, the person support surface 704 may not include the advanced articulation bladder (e.g., for use with a standard person support apparatus).

Still referring to FIG. 7A, the head section 705A of the person support surface 704 may include at least one percussion and vibration bladder 705 (e.g., a percussion and vibration bladder layer). As depicted in FIG. 7A, the at least one percussion and vibration bladder 705 may be positioned above and/or within gaps between (e.g., in the +y direction of the coordinate axes of FIG. 7A) at least one bladder of the support cushion layer 240C (e.g., positioned in and/or near a chest area of a subject). The at least one percussion and vibration bladder 705 may be configured to deliver P&V therapies. A P&V therapy, according to various aspects, may include a percussion frequency from about 1 beat per second to about 5 beats per second and a vibration frequency from about 5 beats per second to about 25 beats per second for about 5 minutes to about 30 minutes in duration. Percussion therapy and vibration therapy can be performed separately or together as a sequential treatment. Each of the percussion and vibration settings may be operate at a low, medium, or high intensity. According to various aspects, P&V therapy duration may be limited if CLRT therapy is being simultaneously performed. In such aspects, operating P&V with CLRT may contribute to elevated person support surface temperatures (e.g., thereby reducing the effectiveness of the MCM layer 250 as described herein). In one aspect, for example, P&V therapy may be limited to about "X" minutes for about every "Y" minutes of CLRT therapy. According to various aspects, air may be supplied to the at least one percussion and vibration bladder 705 from an air source (not shown, e.g., compressor) located on a frame of the person support apparatus 102 (e.g., via at least one supply tube coupled to the frame-based air source). According aspects of the present disclosure, air may be delivered to the at least one percussion and vibration bladder 705 through an oscillating valve in the person support surface 704.

As depicted in FIG. 7A, the person support surface 704 may further include an upper fire barrier 709A and a lower fire barrier 709B (e.g., depicted in phantom as optional). As illustrated in FIG. 7A, the upper fire barrier 709A may encase the MCM layer 250. The upper fire barrier 709A may include a fire-resistant and/or fire-proof material that is flexible, elastic and/or breathable (e.g., such that it does not structurally inhibit the functionalities of the various components encased therein). Similarly, the lower fire barrier 709B may encase the surface foundation layer 210, the turn assist bladder layer 220, the working cushion layer 230, the support cushion layer 240C, and/or the foot bladder layer 760 as well as other components including the head substrate layer 715, the seat substrate layer 717, the foot substrate layer 719, the first enclosure, the second enclosure 713, the air supply enclosure 770, the advanced articulation bladder 703, the percussion and vibration bladder 705, and/or the like. The lower fire barrier 709B may similarly include a fire-resistant and/or fire-proof material that is flexible, elastic and/or breathable (e.g., such that it does not structurally inhibit the functionalities of the various components encased therein).

FIG. 7B depicts a cross-sectional view, along axis D-D of FIG. 7A, of the person support surface 704, according to various aspects described herein. As described in FIG. 7A, the person support surface 704 may include a top encasement portion 106 coupled, via an interlocking device 110 (e.g., zipper or the like), to a bottom encasement portion 108 and the person support surface 704 may house various internal components including the surface foundation layer 210 (e.g., a foam crib), the turn assist bladder layer 220 (e.g., depicted in a deflated state), the working cushion layer 230, the support cushion layer 240C, and the MCM layer 250.

The surface foundation layer 210 of FIG. 7B may restrain lateral movement (e.g., in the +x and −x directions of the coordinate axes of FIG. 7B) of various internal components of the person support surface 704. In particular, a first void 772 may be defined in the surface foundation layer 210 to restrain lateral movement and/or lateral expansion of the turn assist bladder layer 220 and/or the working cushion layer 230. According to various aspects, the first void 772 may be defined by an internally facing surface (e.g., in the +x direction of the coordinate axes of FIG. 7B) of a subject right side bolster 714 and an internally facing surface (e.g., in the −x direction of the coordinate axes of FIG. 7B) of a subject left side bolster 716. Accordingly, the surface foundation layer 210 may permit efficient expansion of the bladders of the turn assist bladder layer 220 and/or the cushions of the working cushion layer 230.

The surface foundation layer 210 may further act as a conduit for at least one supply tube (e.g., the various supply tubes depicted in FIG. 6) that supply a fluid (e.g., air) to the various layers (e.g., 220, 230, 240C, 760 and/or the like) described herein as well as at least one supply tube that supply a fluid (e.g., air) to the MCM layer 250 as described herein. In particular, a subject right channel 774 may be defined in the subject right side bolster 714 and a subject left channel 776 may be defined in the subject left side bolster 716 of the surface foundation layer 210 to act as a conduit for the at least one supply tube as described herein. According to other aspects of the present disclosure, gaps between the various bladders (e.g., the plurality of turn bladders 222, the plurality of working cushion bladders 232, and/or the plurality of adjacent bladders 745A, 745B, 747A, 747B, 762) may act as ducts and/or conduits for the at least one supply tube as described herein.

Referring to FIG. 7B in light of FIG. 2, the head section turn bladder zone 225A (e.g., FIG. 7A) may include a subject head right side zone 224-A and a subject head left side zone 224C. Similarly, the head section working cushion zone 235A may include a subject head right side zone 234A and a subject head left side zone 234C. Further, a head substrate layer 715 may be positioned between the head section turn bladder zone 225A and the head section working cushion zone 235A. According to various aspects described herein, the head substrate layer 715 may comprise a fabric layer or a polymer layer. In some aspects, the head substrate layer 715 may comprise a coated, woven (e.g., non-tear), and/or non-stretch material.

In some aspects, as depicted in FIG. 7B, the head substrate layer 715 may extend from a first lateral side (e.g., in the −x direction of the coordinate axes of FIG. 7B) of the subject head right side zone 224A of the head section turn bladder zone 225A and the subject head right side zone 234A of the head section working cushion zone 235A to a second lateral side (e.g., in the +x direction of the coordinate axes of FIG. 7B) of the subject head left side zone 224C of the head section turn bladder zone 225A and the subject head left side zone 234C of the head section working cushion zone 235A. According to various aspects of the present disclosure, each of the subject head right side zone 224A and the subject head left side zone 224C of the head section turn bladder zone 225A may be coupled to a bottom surface (e.g., in the −y direction of the coordinate axes of FIG. 7B) of the head substrate layer 715. Similarly, according to various aspects of the present disclosure, each of the subject head right side zone 234A and the subject head left side zone 234C of the head section working cushion zone 235A may be coupled to a top surface (e.g., in the +y direction of the coordinate axes of FIG. 7B) of the head substrate layer 715. In such aspects, the head substrate layer 715 may function to keep the various bladders in position within the head section 705A of the person support surface 704 (e.g., relative to other internal components and/or the like).

In other aspects, the head substrate layer 715 may be divided (division shown in phantom as optional). In such aspects, a first portion of the head substrate layer 715 may be positioned between the subject head right side zone 224A of the head section turn bladder zone 225A and the subject head right side zone 234A of the head section working cushion zone 235A. Here, the subject head right side zone 224A of the head section turn bladder zone 225A may be coupled to a bottom surface (e.g., in the −y direction of the coordinate axes of FIG. 7B) of the first portion of the head substrate layer 715 and the subject head right side zone 234A of the head section working cushion zone 235A may be coupled to a top surface (e.g., in the +y direction of the coordinate axes of FIG. 7B) of the first portion of the head substrate layer 715. Similarly, a second portion of the head substrate layer 715 may be positioned between the subject head left side zone 224C of the head section turn bladder zone 225A and the subject head left side zone 234C of the head section working cushion zone 235A. Here, the subject head left side zone 224C of the head section turn bladder zone 225A may be coupled to a bottom surface (e.g., in the −y direction of the coordinate axes of FIG. 7B) of the second portion of the head substrate layer 715 and the subject head left side zone 234C of the head section working cushion zone 235A may be coupled to a top surface (e.g., in the +y direction of the coordinate axes of FIG. 7B) of the second portion of the head substrate layer 715.

In some aspects, the head substrate layer 715 (e.g., depicted in FIG. 7B in phantom as optional) may extend upwardly (e.g., in the +y direction of the coordinate axes of FIG. 7B) on the first lateral side (e.g., in the −x direction of the coordinate axes of FIG. 7B) and the second lateral side (e.g., in the +x direction of the coordinate axes of FIG. 7B). In such aspects, a first lateral end (e.g., in the −x direction of the coordinate axes of FIG. 7B) of each of the plurality of adjacent bladders 745A, 745B, 745C of the first and second sectors S1, S2 (FIG. 7A) may couple to the head substrate layer 715 on the first lateral side and a second lateral end (e.g., in the +x direction of the coordinate axes of FIG. 7B) of each of the plurality of adjacent bladders 745A, 745B, 745C of the of the first and second sectors S1, S2 (FIG. 7A) may couple to the head substrate layer 715 on the second lateral side to keep the various bladders within the first and/or second sectors S1, S2 (FIG. 7A) in position within the head section 705A of the person support surface 704. According to various aspects, the first lateral end and the second lateral end of each of the plurality of adjacent bladders 745A, 745B, 745C may include a fastener insertable within respective receiving apertures (not shown) defined and positioned in the head substrate layer 715 for each of the plurality of adjacent bladders 745A, 745B, 745C.

Figure 7C:
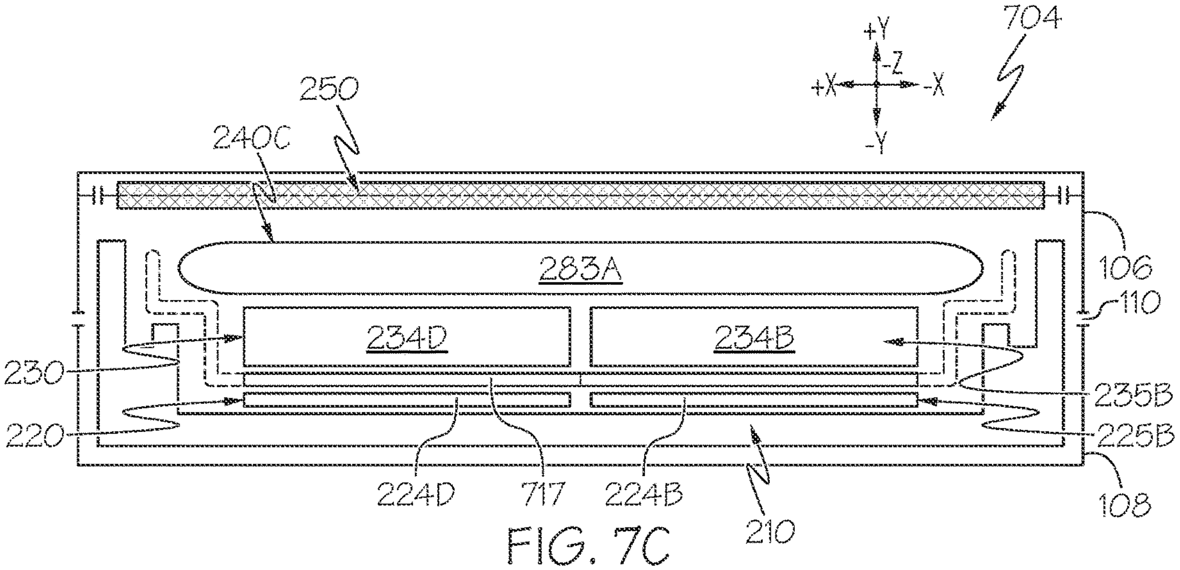
FIG. 7C depicts a cross-sectional view, along axis E-E of FIG. 7A, of the person support surface according to one or more aspects shown and described herein.

FIG. 7C depicts a cross-sectional view, along axis E-E of FIG. 7A, of the person support surface 704, according to various aspects described herein. Referring to FIG. 7C in light of FIG. 2, the seat section turn bladder zone 225B (e.g., FIG. 7A) may include a subject seat right side zone 224B and a subject seat left side zone 224D. Similarly, the seat section working cushion zone 235B may include a subject seat right side zone 234B and a subject seat left side zone 234D. Further As depicted in FIG. 7C, a seat substrate layer 717 may be positioned between the seat section turn bladder zone 225B and the seat section working cushion zone 235B. According to various aspects described herein, the seat substrate layer 717 may comprise a fabric layer or a polymer layer. In some aspects, the seat substrate layer 717 may comprise a coated, woven (e.g., non-tear), and/or non-stretch material.

In some aspects, as depicted in FIG. 7C, the seat substrate layer 717 may extend from a first lateral side (e.g., in the −x direction of the coordinate axes of FIG. 7C) of the subject seat right side zone 224B of the seat section turn bladder zone 225B and the subject seat right side zone 234B of the seat section working cushion zone 235B to a second lateral side (e.g., in the +x direction of the coordinate axes of FIG. 7C) of the subject seat left side zone 224D of the seat section turn bladder zone 225B and the subject seat left side zone 234D of the seat section working cushion zone 235B. According to various aspects of the present disclosure, each of the subject seat right side zone 224B and the subject seat left side zone 224D of the seat section turn bladder zone 225B may be coupled to a bottom surface (e.g., in the −y direction of the coordinate axes of FIG. 7C) of the seat substrate layer 717. Similarly, according to various aspects of the present disclosure, each of the subject seat right side zone 234B and the subject seat left side zone 234D of the seat section working cushion zone 235B may be coupled to a top surface (e.g., in the +y direction of the coordinate axes of FIG. 7C) of the seat substrate layer 717. In such aspects, the seat substrate layer 717 may function to keep the various zones (e.g., 224B, 224D, 234B, 234D) in position within the seat section 705B of the person support surface 704 (e.g., relative to other internal components and/or the like).

In other aspects, the seat substrate layer 717 may be divided (depicted in phantom as optional). In such aspects, a first portion of the seat substrate layer 717 may be positioned between the subject seat right side zone 224B of the seat section turn bladder zone 225B and the subject seat right side zone 234B of the seat section working cushion zone 235B. Here, the subject seat right side zone 224B of the seat section turn bladder zone 225B may be coupled to a bottom surface (e.g., in the −y direction of the coordinate axes of FIG. 7C) of the first portion of the seat substrate layer 717 and the subject seat right side zone 234B of the seat section working cushion zone 235B may be coupled to a top surface (e.g., in the +y direction of the coordinate axes of FIG. 7C) of the first portion of the head substrate layer 715. Similarly, a second portion of the seat substrate layer 717 may be positioned between the subject seat left side zone 224D of the seat section turn bladder zone 225B and the subject seat left side zone 234D of the seat section working cushion zone 235B. Here, the subject seat left side zone 224D of the seat section turn bladder zone 225B may be coupled to a bottom surface (e.g., in the −y direction of the coordinate axes of FIG. 7C) of the second portion of the seat substrate layer 717 and the subject seat left side zone 234D of the seat section working cushion zone 235B may be coupled to a top surface (e.g., in the +y direction of the coordinate axes of FIG. 7C) of the second portion of the seat substrate layer 717.

In some aspects, the seat substrate layer 717 may extend upwardly (e.g., in the +y direction of the coordinate axes of FIG. 7C) on the first lateral side (e.g., in the −x direction of the coordinate axes of FIG. 7C) and the second lateral side (e.g., in the +x direction of the coordinate axes of FIG. 7C). In such aspects, a first lateral end (e.g., in the −x direction of the coordinate axes of FIG. 7C) of each of the plurality of adjacent bladders 747A, 747B in or around the third sector S3 (FIG. 7A) may couple to the seat substrate layer 717 on the first lateral side and a second lateral end (e.g., in the +x direction of the coordinate axes of FIG. 7C) of each of the plurality of adjacent bladders 747A, 747B in or around the third sector S3 (FIG. 7A) may couple to the seat substrate layer 717 on the second lateral side to keep the various bladders thereof adequately positioned. According to various aspects, the first lateral end and the second lateral end of each of the plurality of adjacent bladders 747A, 747B may include a fastener insertable within respective receiving apertures (not shown) defined and positioned in the seat substrate layer 717 for each of the plurality of adjacent bladders 747A, 747B.

Figure 7D:
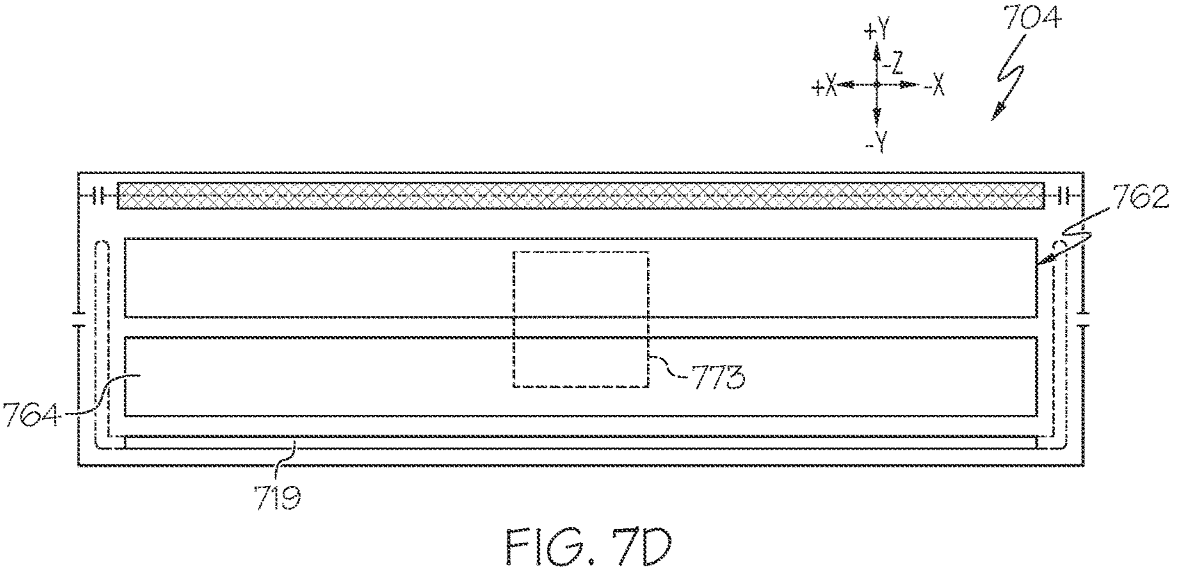
FIG. 7D depicts a cross-sectional view, along axis F-F of FIG. 7A, of the person support surface according to one or more aspects shown and described herein.

FIG. 7D depicts a cross-sectional view, along axis F-F of FIG. 7A, of the person support surface 704, according to various aspects described herein. As described in FIG. 7A, the foot bladder layer 760 may include a plurality of foot bladders 762 positioned over (e.g., in the +y direction of the coordinate axes of FIG. 7D) a foot support layer 764. The foot substrate layer 719 may be positioned below (e.g., in the −y direction of the coordinate axes of FIG. 7D) the foot support layer 764. According to various aspects described herein, the foot substrate layer 719 may comprise a fabric layer or a polymer layer. In some aspects, the foot substrate layer 719 may comprise a coated, woven (e.g., non-tear), and/or non-stretch material.

In some aspects, as depicted in FIG. 7D, the foot substrate layer 719 may extend from a first lateral side (e.g., in the −x direction of the coordinate axes of FIG. 7D) of the foot support layer 764 to a second lateral side (e.g., in the +x direction of the coordinate axes of FIG. 7D) of the foot support layer 764. According to various aspects of the present disclosure, the foot support layer 764 may be coupled to a top surface (e.g., in the +y direction of the coordinate axes of FIG. 7D) of the foot substrate layer 719. In such aspects, the foot substrate layer 719 may function to keep the foot support layer 764 in position within the foot section 705C of the person support surface 704 (e.g., relative to other internal components and/or the like).

In some aspects, the foot substrate layer 719 (e.g., depicted in FIG. 7D in phantom as optional) may extend upwardly (e.g., in the +y direction of the coordinate axes of FIG. 7D) on the first lateral side (e.g., in the −x direction of the coordinate axes of FIG. 7D) and the second lateral side (e.g., in the +x direction of the coordinate axes of FIG. 7D). In such aspects, a first lateral end (e.g., in the −x direction of the coordinate axes of FIG. 7D) of each of the plurality of foot bladders 762 of the foot bladder layer 760 may couple to the foot substrate layer 719 on the first lateral side and a second lateral end (e.g., in the +x direction of the coordinate axes of FIG. 7D) of each of the plurality of foot bladders 762 of the foot bladder layer 760 may couple to the foot substrate layer 719 on the second lateral side to keep the plurality of foot bladders 762 in position within the foot section 705C of the person support surface 704. According to various aspects, the first lateral end and the second lateral end of each of the plurality of foot bladders 762 may include a fastener insertable within respective receiving apertures (not shown) defined and positioned in the foot substrate layer 719 for each of the plurality of foot bladders 762.

As depicted in FIG. 9D, according to various aspects of the present disclosure, the foot section 705C (FIG. 7A) of the person support surface 704 may house an enclosure 773 (e.g., shown in phantom as optional). The enclosure 773 may be positioned within a central portion (e.g., in the +y and −y directions, in the +z and −z directions, and/or in the +x and −x directions) of the foot section 705C (e.g., surrounded by the plurality of foot bladders 762). In some aspects, the enclosure 773 (e.g., pneumatic air control box, electrical air control box, or combination thereof) may house air valves, air manifolds, and/or air control boards, to support continuous low pressure (CLP), alternating pressure (AP), and/or alternating low pressure (ALP) functionality as described herein. In one aspect, for example, the enclosure 773 may house components including an alternating air manifold (not shown, e.g., independent of or dependent on (e.g., downstream of) an air manifold of the first enclosure 711) and an alternating air control board (not shown, e.g., that controls the alternating air manifold to distribute air) to provide the CLP and/or ALP functionality, as described herein. According to other aspects, the enclosure 773 of the foot section 705C may house air valves, air manifolds, air control boards, a blower, and/or a compressor (e.g., similar to the first enclosure 211, the second enclosure 213, and the third enclosure 270 of FIG. 2) to distribute air to the plurality of bladders, air bladders, and/or MCM layer 250 as discussed herein. In one aspect, for example, the enclosure 773 may house components including an air supply such as a blower, a blower control board, a compressor, a compressor control board, and/or the like (e.g., independent of or dependent on (e.g., slave to) an air control board of the second enclosure 713) to supply a cooling fluid to the MCM layer 250, as described herein. In another aspect, for example, the enclosure 773 may house an air supply without a separate control board (e.g., air supply controlled by the air control board of the second enclosure 713). According to various aspects, positioning such an enclosure 773 in the foot section 705C may further define a relatively larger radiolucent window, as discussed elsewhere herein.

Continuous and/or Alternating Low Pressure Functionality

Accordingly, in light of FIG. 7A, various aspects of the present disclosure include a continuous low pressure (CLP) functionality. In such aspects, each bladder of the various sectors S1-S4 may be controlled (e.g., inflated, deflated, and/or vented) to maintain a continuous low pressure. According to various aspects, the continuous low pressure may be a balanced pressure. In such aspects, a balanced pressure may be a pressure that corresponds to a load of the subject that optimally supports the subject while reducing pressure on the subject's body. According to various aspects, as the load changes relative to the bladders of each sector S1-S4 (e.g., subject changes position, person support apparatus itself changes position, and/or the like), the balanced pressure may be adjusted in each bladder and/or each foot bladder, respectively. In some aspects, one or more pressure transducers associated with each bladder and/or foot bladder, and/or a subject weight scale associated with a frame of the person support apparatus 102 (FIG. 1) may detect such load changes and an air control board (e.g., of enclosure 773) may adjust any balanced pressure(s) based on factors including a subject's weight, a position of the person support apparatus 102, and/or the like. In some aspects, the head bladder 745C may (e.g., independently) maintain and/or adjust a balanced pressure to support the subject's head with minimal movement.

Furthermore, in light of FIG. 7A, various aspects of the present disclosure include an alternating low pressure (ALP) functionality. In such aspects, pressure redistribution may be realized by deflating (e.g., wholly or partially) and re-inflating (e.g., wholly or partially) alternate bladders and/or foot bladders to relieve pressure on a subject's body. Such aspects may further reduce the occurrence of pressure injuries. According to various aspects described herein, the deflating and re-inflating may occur periodically. Accordingly, the person support surface 704 of FIG. 7A is capable of providing not only pulmonary therapies (e.g., CLRT & P&V, as described herein) but also CLP and ALP therapies in addition to MCM.

As depicted in FIG. 7A, the head section 705A (e.g., generally encompassing the first sector S1 and the second sector S2) may include a first zone of alternating bladders 745A (e.g., marked with "1" in FIG. 7A), a second zone of alternating bladders 745B (e.g., marked with "2" in FIG. 7A) and a head bladder 745C. In such an aspect, the first zone of alternating bladders 745A may be controlled (e.g., inflated, deflated, and/or vented) independent of the second zone of alternating bladders 745B and/or the head bladder 745C. In some aspects, the head bladder 745C of the head section 705A may simply maintain and/or adjust a balanced pressure to support the subject's head with minimal movement. Under ALP, however, the first zone of alternating bladders 745A may, periodically, be at least partially deflated (e.g., to vent within the person support surface 704 and/or via a valve-controlled deflation) to redistribute a portion of pressure on the subject's body in the head section 705A from the first zone of alternating bladders 745A to the second zone of alternating bladders 745B. The second zone of alternating bladders 745B may be inflated prior to and/or during deflation of the first zone of alternating bladders 745A. Likewise, under ALP, the second zone of alternating bladders 745B may, periodically, be at least partially deflated (e.g., to vent within the person support surface 704 and/or via a valve-controlled deflation) to redistribute a portion of pressure on the subject's body in the head section 705A from the second zone of alternating bladders 745B to the first zone of alternating bladders 745A. The first zone of alternating bladders 745A may be inflated prior to and/or during deflation of the second zone of alternating bladders 745B.

As one example, the first zone of alternating bladders 745A and the second zone of alternating bladders 745B may be controlled in a set of phases. In a first phase, each bladder of the first zone of alternating bladders 745A may be deflated to a relatively low pressure (e.g., relative to the balanced pressure as described herein) and each bladder of the second zone of alternating bladders 745B may be inflated to a relatively high pressure (e.g., relative to the balanced pressure as described herein). In some aspects, the low pressure may be a near-zero pressure, a near-atmospheric pressure, or the like and the high pressure may be a predetermined percentage (e.g., 10%-20%) higher than the balanced pressure. A duration of the first phase may be a first defined time period (e.g., "R" minutes, up to a predetermined maximum of "S" minutes, and/or the like). As one example, the first defined time period may be about 1.5 minutes up to about 15 minutes. Continuing the example, in a second phase, each bladder of the first zone of alternating bladders 745A may be inflated to the balanced pressure and each bladder of the second zone of alternating bladders 745B may be deflated to the balanced pressure. Accordingly, each bladder of the first zone of alternating bladders 745A and each bladder of the second zone of alternating bladders 745B would realize the same balanced pressure. A duration of the second phase may be a second defined time period (e.g., "T" minutes, up to a predetermined maximum of "U" minutes, and/or the like). As one example, the second defined time period may be about 1.5 minutes up to about 15 minutes. Further continuing the example, in a third phase, each bladder of the second zone of alternating bladders 745B may be deflated to a relatively low pressure (e.g., relative to the balanced pressure as described herein) and each bladder of the first zone of alternating bladders 745A may be inflated to a relatively high pressure (e.g., relative to the balanced pressure as described herein). In some aspects, the low pressure may be a near-zero pressure, a near-atmospheric pressure, or the like and the high pressure may be a predetermined percentage (e.g., 10%-20%) higher than the balanced pressure. A duration of the third phase may be a third defined time period (e.g., "V" minutes, up to a predetermined maximum of "W" minutes, and/or the like). As one example, the third defined time period may be about 1.5 minutes up to about 15 minutes. Accordingly, in some aspects, a pressure in each bladder of the head section 705A may alternate (e.g., AP, ALP) from a high pressure or a low pressure to a balanced pressure or from a balanced pressure to a high pressure or a low pressure. In other aspects, a pressure in each bladder of the head section 705A may alternate (e.g., AP, ALP) from a high pressure to a low pressure without a balanced pressure phase or from a low pressure to a high pressure without a balanced pressure phase.

The seat section 705B (e.g., generally encompassing the third sector S3) may include a first zone of alternating bladders 747A (e.g., marked with "1" in FIG. 7A) and a second zone of alternating bladders 747B (e.g., marked with "2" in FIG. 7A). In such an aspect, the first zone of alternating bladders 747A may be controlled (e.g., inflated, deflated, and/or vented) independent of the second zone of alternating bladders 747B. Accordingly, under AP or ALP, the first zone of alternating bladders 747A may, periodically, be at least partially deflated (e.g., to vent within the person support surface 704 and/or via a valve-controlled deflation) to redistribute a portion of pressure on the subject's body in the seat section 705B from the first zone of alternating bladders 747A to the second zone of alternating bladders 747B. The second zone of alternating bladders 747B may be inflated prior to and/or during deflation of the first zone of alternating bladders 747A. Likewise, under AP or ALP, the second zone of alternating bladders 747B may, periodically, be at least partially deflated (e.g., to vent within the person support surface 704 and/or via a valve-controlled deflation) to redistribute a portion of pressure on the subject's body in the seat section 705B from the second zone of alternating bladders 747B to the first zone of alternating bladders 747A. The first zone of alternating bladders 747A may be inflated prior to and/or during deflation of the second zone of alternating bladders 747B.

As one example, the first zone of alternating bladders 747A and the second zone of alternating bladders 747B may be controlled in a set of phases. In a first phase, each bladder of the first zone of alternating bladders 747A may be deflated to a relatively low pressure (e.g., relative to the balanced pressure as described herein) and each bladder of the second zone of alternating bladders 747B may be inflated to a relatively high pressure (e.g., relative to the balanced pressure as described herein). In some aspects, the low pressure may be a near-zero pressure, a near-atmospheric pressure, or the like and the high pressure may be a predetermined percentage (e.g., 10%-20%) higher than the balanced pressure. A duration of the first phase may be a first defined time period (e.g., "R" minutes, up to a predetermined maximum of "S" minutes, and/or the like). As one example, the first defined time period may be about 1.5 minutes up to about 15 minutes. Continuing the example, in a second phase, each bladder of the first zone of alternating bladders 747A may be inflated to the balanced pressure and each bladder of the second zone of alternating bladders 747B may be deflated to the balanced pressure. Accordingly, each bladder of the first zone of alternating bladders 747A and each bladder of the second zone of alternating bladders 747B would realize the same balanced pressure. A duration of the second phase may be a second defined time period (e.g., "T" minutes, up to a predetermined maximum of "U" minutes, and/or the like). As one example, the second defined time period may be about 1.5 minutes up to about 15 minutes. Further continuing the example, in a third phase, each bladder of the second zone of alternating bladders 747B may be deflated to a relatively low pressure (e.g., relative to the balanced pressure as described herein) and each bladder of the first zone of alternating bladders 747A may be inflated to a relatively high pressure (e.g., relative to the balanced pressure as described herein). In some aspects, the low pressure may be a near-zero pressure, a near-atmospheric pressure, or the like and the high pressure may be a predetermined percentage (e.g., 10%-20%) higher than the balanced pressure. A duration of the third phase may be a third defined time period (e.g., "V" minutes, up to a predetermined maximum of "W" minutes, and/or the like). As one example, the third defined time period may be about 1.5 minutes up to about 15 minutes. Accordingly, in some aspects, a pressure in each bladder of the seat section 705B may alternate (e.g., AP, ALP) from a high pressure or a low pressure to a balanced pressure or from a balanced pressure to a high pressure or a low pressure. In other aspects, a pressure in each bladder of the seat section 705B may alternate (e.g., AP, ALP) from a high pressure to a low pressure without a balanced pressure phase or from a low pressure to a high pressure without a balanced pressure phase.

The foot section 705C (e.g., generally encompassing the fourth sector S4) may include a first set of alternating foot bladders 749A (e.g., marked with "1" in FIG. 7A) and a second set of alternating foot bladders 749B (e.g., marked with "2" in FIG. 7A). In such an aspect, the first set of alternating foot bladders 749A may be controlled (e.g., inflated, deflated, and/or vented) independent of the second set of alternating foot bladders 749B. Accordingly, under AP or ALP, the first set of alternating foot bladders 749A may, periodically, be at least partially deflated (e.g., to vent within the person support surface 704 and/or via a valve-controlled deflation) to redistribute a portion of pressure on the subject's body in the foot section 705C from the first set of alternating foot bladders 749A to the second set of alternating foot bladders 749B. The second set of alternating foot bladders 749B may be inflated prior to and/or during deflation of the first set of alternating foot bladders 749A. Likewise, under AP or ALP, the second set of alternating foot bladders 749B may, periodically, be at least partially deflated (e.g., to vent within the person support surface 704 and/or via a valve-controlled deflation) to redistribute a portion of pressure on the subject's body in the foot section 705C from the second set of alternating foot bladders 749B to the first set of alternating foot bladders 749A. The first set of alternating foot bladders 749A may be inflated prior to and/or during deflation of the second set of alternating foot bladders 749B. As one example, the first set of alternating foot bladders 749A and the second set of alternating foot bladders 749B may be controlled in a set of phases. In a first phase, each air bladder of the first set of alternating foot bladders 749A may be deflated to a relatively low pressure (e.g., relative to the balanced pressure as described herein) and each air bladder of the second set of alternating foot bladders 749B may be inflated to a relatively high pressure (e.g., relative to the balanced pressure as described herein). In some aspects, the low pressure may be a near-zero pressure, a near-atmospheric pressure, or the like and the high pressure may be a predetermined percentage (e.g., 10%-20%) higher than the balanced pressure. A duration of the first phase may be a first defined time period (e.g., "R" minutes, up to a predetermined maximum of "S" minutes, and/or the like).

As one example, the first defined time period may be about 1.5 minutes up to about 15 minutes. Continuing the example, in a second phase, each air bladder of the first set of alternating foot bladders 749A may be inflated to the balanced pressure and each air bladder of the second set of alternating air bladders 749B may be deflated to the, balanced pressure. Accordingly, each air bladder of the first set of alternating foot bladders 749A and each air bladder of the second set of alternating foot bladders 749B would realize the same balanced pressure. A duration of the second phase may be a second defined time period (e.g., "T" minutes, up to a predetermined maximum of "U" minutes, and/or the like). As one example, the second defined time period may be about 1.5 minutes up to about 15 minutes. Further continuing the example, in a third phase, each air bladder of the second set of alternating foot bladders 749B may be deflated to a relatively low pressure (e.g., relative to the balanced pressure as described herein) and each air bladder of the first set of alternating foot bladders 749A may be inflated to a relatively high pressure (e.g., relative to the balanced pressure as described herein). In some aspects, the low pressure may be a near-zero pressure, a near-atmospheric pressure, or the like and the high pressure may be a predetermined percentage (e.g., 10%-20%) higher than the balanced pressure. A duration of the third phase may be a third defined time period (e.g., "V" minutes, up to a predetermined maximum "W" minutes, and/or the like). As one example, the third defined time period may be about 1.5 minutes up to about 15 minutes. Accordingly, in some aspects, a pressure in each air bladder of the foot section 705C may alternate (e.g., AP or ALP) from a high pressure or a low pressure to a balanced pressure or from a balanced pressure to a high pressure or a low pressure. In other aspects, a pressure in each air bladder of the foot section 705C may alternate (e.g., AP or ALP) from a high pressure to a low pressure without a balanced pressure phase or from a low pressure to a high pressure without a balanced pressure phase.

Referring still to FIG. 7A, in some aspects, the head section 705A, the seat section 705B, and/or the foot section 705C may be associated with a same balanced pressure. In other aspects, each of the head section 705A, the seat section 705B, and/or the foot section 705C may be associated with a different balanced pressure. Accordingly, the person support surface 704 of the present disclosure is capable of isolating ALP associated with the head section 705A, ALP associated with the seat section 705B, and/or ALP associated with the foot section 705C to optimize and/or customize pressures experienced by a subject's body. Furthermore, the ability to isolate ALP associated with the head section 705A, ALP associated with the seat section 705B, and/or ALP associated with the foot section 705C enables the person support surface 704 to maintain existing person support surface functionalities (e.g., seat section deflate, seat section and/or foot section deflate during chair egress, and/or the like). In yet further aspects, the balanced pressure in each of the head section 705A, the seat section 705B, and/or the foot section 705C may be manually selectable/adjustable (e.g., to a comfort level of the subject, increase and/or decrease the balanced pressure to feel, and/or the like) via a user interface 124 (FIG. 1, e.g., display) of the person support apparatus 102 (FIG. 1).

According to various aspects, referring still to FIG. 7A, the first zone of alternating bladders 745A of the head section 705A, the first zone of alternating bladders 747A of the seat section 705B, and/or the first set of alternating foot bladders 749A of the foot section 705C may be controlled (e.g., inflated, deflated, and/or vented) simultaneously or sequentially. In one aspect, each first zone of alternating bladders 745A, 747A, and/or 749A (e.g., all marked with "1" in FIG. 7A) may be controlled (e.g., inflated, deflated, and/or vented) at the same time or substantially the same time. In one example, each first zone of alternating bladders 745A, 747A, and/or 749A may be controlled (e.g., inflated, deflated, and/or vented at the same time or substantially the same time) via the set of phases, as described herein. In another example, each first zone of alternating bladders 745A, 747A, and/or 749A may be controlled (e.g., inflated, deflated, and/or vented at the same time or substantially the same time) to any predetermined pressure for any defined time period (e.g., "X" minutes, "Y" seconds, and/or the like). In a further aspect, each first zone of alternating bladders 745A, 747A, and/or 749A may be controlled (e.g., inflated, deflated, and/or vented) sequentially. In one example, the first zone of alternating bladders 745A of the head section 705A may be controlled (e.g., inflated, deflated, and/or vented to any predetermined pressure for any defined time period), then the first zone of alternating bladders 747A of the seat section 705B may be controlled (e.g., inflated, deflated, and/or vented to any predetermined pressure for any defined time period), and then the first set of alternating foot bladders 749A of the foot section 705C may be controlled (e.g., inflated, deflated, and/or vented to any predetermined pressure for any defined time period). In such aspects, sequential actuation may emulate a wave-like motion between a proximal end (e.g., to the +z direction of the coordinate axes of FIG. 7A) and a distal end (e.g., in the −z direction of the coordinate axes of FIG. 7A) of the person support surface 704. Here it should be appreciated that the first zone of alternating bladders 745A of the head section 705A, the first zone of alternating bladders 747A of the seat section 705B, and/or the first set of alternating foot bladders 749A of the foot section 705C may be actuated in a different sequence (e.g., for different wave-like motions). In addition, it should be appreciated that the various sectors S1-S4 earl be deactivated such that the wave-like motions do not occur in particular sectors, while remaining on in other sectors, as described herein.

Similarly, referring still to FIG. 7A, the second zone of alternating bladders 745B of the head section 705A, the second zone of alternating bladders 747B of the seat section 705B, and/or the second set of alternating foot bladders 749B of the foot section 705C may be controlled (e.g., inflated, deflated, and/or vented) simultaneously or sequentially. In one aspect, each second zone of alternating bladders 745B, 747B, and/or 749B (e.g., all marked with "2" in FIG. 7A) may be controlled (e.g., inflated, deflated, and/or vented) at the same time or substantially the same time. In one example, each second zone of alternating bladders 745B, 747B, and/or 749B may be controlled (e.g., inflated, deflated, and/or vented at the same time or substantially the same time) via the set of phases, as described herein. In another example, each second zone of alternating bladders 745B, 747B, and/or 749B may be controlled (e.g., inflated, deflated, and/or vented at the same time or substantially the same time) to any predetermined pressure for any defined time period (e.g., "X" minutes, "Y" seconds, and/or the like). In a further aspect, each second zone of alternating bladders 745B, 747B, and/or 749B may be controlled (e.g., inflated, deflated, and/or vented) sequentially. In one example, the second zone of alternating bladders 745B of the head section 705A may be controlled (e.g., inflated, deflated, and/or vented to any predetermined pressure for any defined time period), then the second zone of alternating bladders 747B of the seat section 705B may be controlled (e.g., inflated, deflated, and/or vented to any predetermined pressure for any defined time period), and then the second set of alternating foot bladders 749B of the foot section 705C may be controlled (e.g., inflated, deflated, and/or vented to any predetermined pressure for any defined time period). In such aspects, sequential actuation may emulate a wave-like motion between a proximal end (e.g., in the +z direction of the coordinate axes of FIG. 7A) and a distal end (e.g., in the −z direction of the coordinate axes of FIG. 7A) of the person support surface 704. Here it should be appreciated that the second zone of alternating bladders 745B of the head section 705A, the second zone of alternating bladders 747B of the seat section 705B, and/or the second set of alternating foot bladders 749B of the foot section 705C may be actuated in a different sequence (e.g., for different wave-like motions). In addition, it should be appreciated that the various sectors S1-S4 can be deactivated such that the wave-like motions do not occur in particular sectors, while remaining on in other sectors, as described herein.

According to yet further aspects, each first zone of alternating bladders 745A, 747A, and/or 749A (e.g., all marked with "1" in FIG. 7A) and each second zone of alternating bladders 745B, 747B, and/or 749B (e.g., all marked with "2" in FIG. 7A) may be controlled (e.g., inflated, deflated, and/or vented) simultaneously or sequentially. In one example, the first zone of alternating bladders 745A and the second zone of alternating bladders 745B of the head section 705A, and/or the first zone of alternating bladders 747A and the second zone of alternating bladders 747B of the seat section 705B, and/or the first set of alternating foot bladders 749A and the second set of alternating foot bladders 749B of the foot section 705C may be controlled (e.g., inflated, deflated, and/or vented) at the same time or substantially the same tune. In another example, the first zone of alternating bladders 745A may be controlled (e.g., inflated, deflated, and/or vented to any predetermined pressure for any defined time period), then the second zone of alternating bladders 745B may be controlled (e.g., inflated, deflated, and/or vented to any predetermined pressure for any defined time period), then the first zone of alternating bladders 747A may be controlled (e.g., inflated, deflated, and/or vented to any predetermined pressure for any defined time period), then the second zone of alternating bladders 747B may be controlled (e.g., inflated, deflated, and/or vented to any predetermined pressure for any defined time period), then the first set of alternating foot bladders 749A may be controlled (e.g., inflated, deflated, and/or vented to any predetermined pressure for any defined time period), and then the second set of alternating foot bladders 749B may be controlled (e.g., inflated, deflated, and/or vented to any predetermined pressure for any defined time period). In such aspects, sequential actuation may emulate a wave-like motion between a proximal end (e.g., in the +z direction of the coordinate axes of FIG. 7A) and a distal end (e.g., in the −z direction of the coordinate axes of FIG. 7A) of the person support surface 704. Here it should be appreciated that each first zone of alternating bladders 745A, 747A, and/or 749A (e.g., all marked with "1" in FIG. 7A) and/or each second zone of alternating bladders 745B, 747B, and/or 749B (e.g., all marked with "2" in FIG. 7A) may be actuated (e.g., together and/or individually) in a different sequence (e.g., for different wave-like motions). Such wave-like motions, as described herein, may produce a massaging (e.g., comfort) effect for the subject, further reduce the risks of pressure injuries as described herein, and/or the like. In some aspects, such wave-like motions may be similarly produced using various zones as described herein (e.g., FIG. 3). As noted above, it should be appreciated that the various sectors S1-S4 can be deactivated such that the wave-like motions do not occur in particular sectors, while remaining on in other sectors, as described herein.

In light of FIG. 7A, it should be understood that the head section 705A, the seat section 705B, and/or the foot section 705C may be arranged differently. For example, each of the head section 705A and the seat section 705B may include more than two zones of bladders that function as described herein and the foot section 705C may include more than two zones of air bladders that function as described herein. Furthermore, the person support surface 704 may define yet further sectors (e.g., a thigh sector, a lumbar sector, and/or the like) where each sector includes two or more zones of bladders that function as described herein.

Figure 8A:
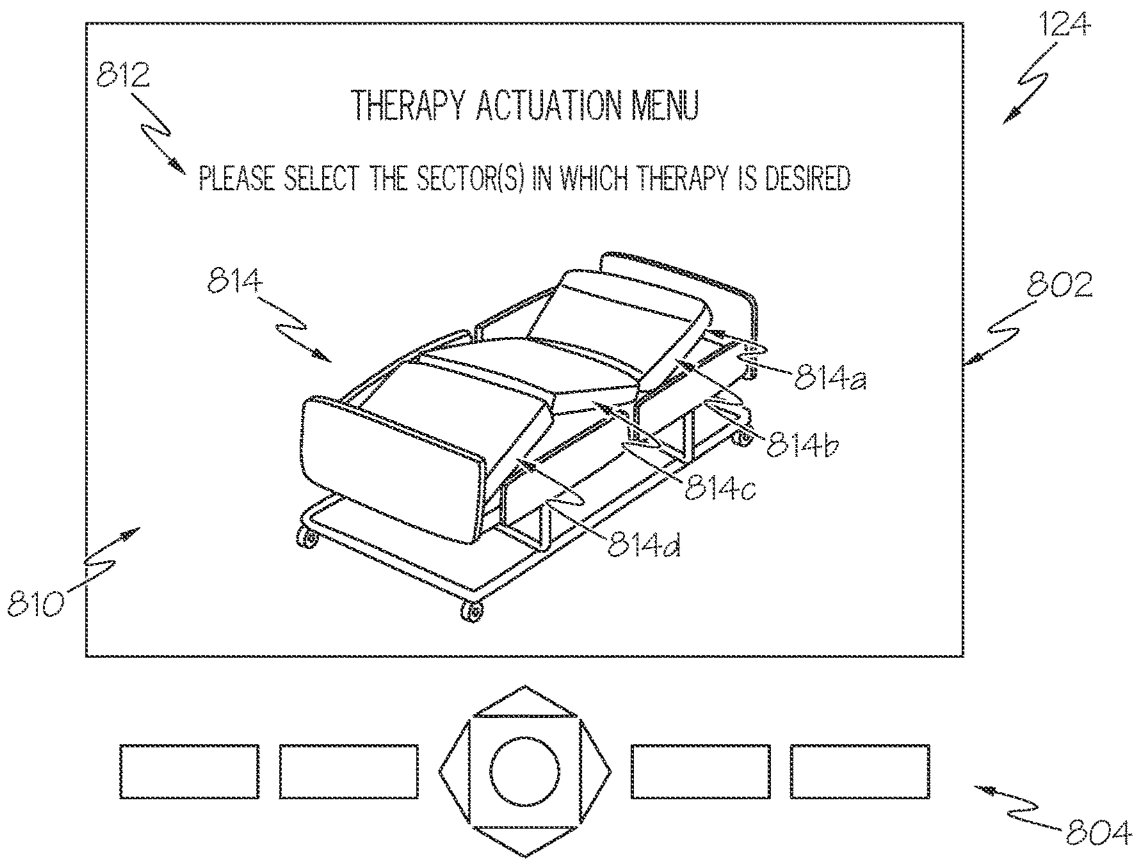
FIG. 8A depicts illustrative details of a user interface component of the person support system of FIG. 1 according to one or more aspects shown and described herein.

Referring now to FIG. 8A, the user interface 124 of the person support apparatus 102 (FIG. 1) includes a display 802 and one or more input hardware components 804, such as buttons, a joystick, or the like. In some aspects, the user interface 124 may integrate the display 802 and the one or more input hardware components 804 into a single component (e.g., a touch screen display). The display 802 and the one or more input hardware components 804 may generally provide the necessary functionality for allowing a user to select the various sectors (e.g., with reference to FIG. 3, the first sector S1, the second sector S2, the third sector S3, the fourth sector S4, and/or the like) in which air therapy, such as AP, ALP, P&V, CLRT, CLP, and/or the like are desired. As such, the user interface 124 may display (e.g., via the display 802) a therapy actuation menu 810 or the like, as shown in FIG. 8. The therapy actuation menu 810 may include, for example, one or more instructions 812 and/or one or more selectable sectors 814. The one or more instructions 812, which may be optional, may generally provide instructions to the user for selecting sectors by displaying text (e.g., "PLEASE SELECT THE SECTOR(S) IN WHICH THERAPY IS DESIRED") as shown in FIG. 8A. The one or more selectable sectors 814 may presented as an image of a bed as depicted in FIG. 8A and/or may be presented as a textual list. The one or more selectable sectors may have particular selectable areas 814*a*, 814*b*, 814*c*, 814*d* that correspond to the various sectors (e.g., sectors S1, S2, S3, S4 depicted in FIG. 3).

Figure 8B:
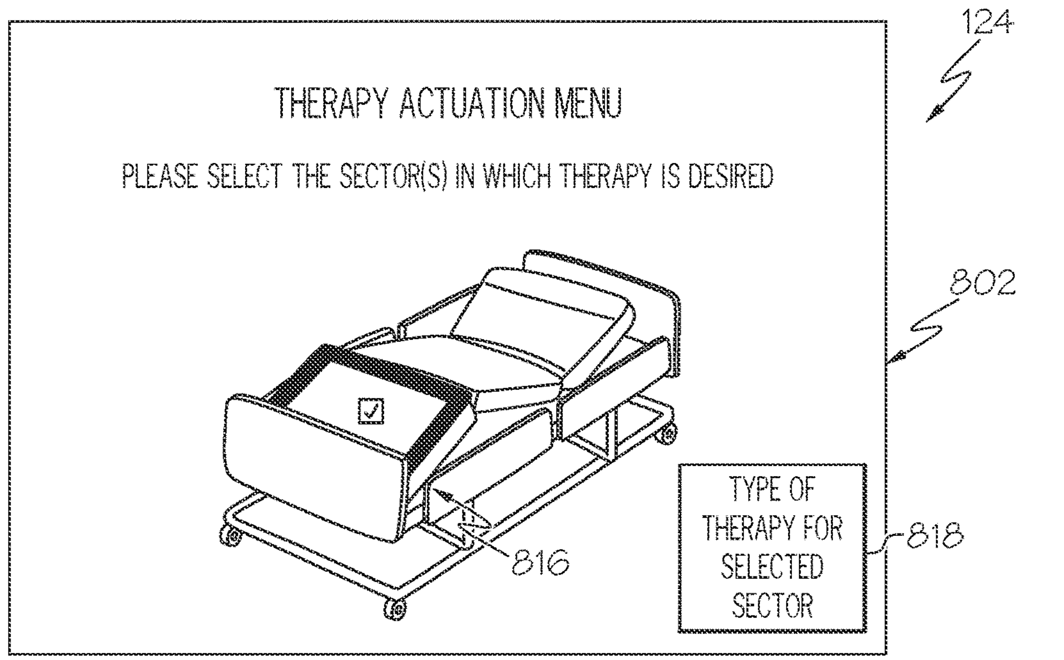
FIG. 8B depicts an illustrative therapy actuation menu provided by the user interface component of FIG. 8A according to one or more aspects shown and described herein.

Referring to FIG. 8B, when a user makes one or more particular selections via the user interface 124, the corresponding sectors that are actuated may be indicated accordingly. For example, the user interface 124 may display a selected sector 816 on the display 802, as shown in FIG. 8B. The displayed selected sector 816 may be depicted as a bolded selection, a highlighted selection, an animated section, with text, with a check mark, and/or the like (FIG. 8B depicts a bolded section with the check mark). In some aspects, the user may be provided with additional prompts, such as, for example, a prompt to select the type of air therapy desired in the selected sector(s) (e.g., AP, ALP, P&V, CLRT, CLP, and/or the like), a prompt to confirm a selection, a prompt to confirm details regarding the selected therapy (e.g., length of time, intensity of movement, type of movement, etc.), and/or the like. In some aspects, the user interface 124 may display a confirmation of the additional prompts in a supplemental box 818 or the like. Once a user selects sector(s) for actuation and selects various additional details (e.g., type of therapy for the like) for each of the selected sector(s), information (e.g., data, signals, and/or the like) may be supplied to a controller (e.g., control circuit 648 described herein with respect to FIG. 6), which determines the various bladders included within the selected sectors, determines an inflation/deflation schedule, and/or the like, as described herein.

Figure 8C:
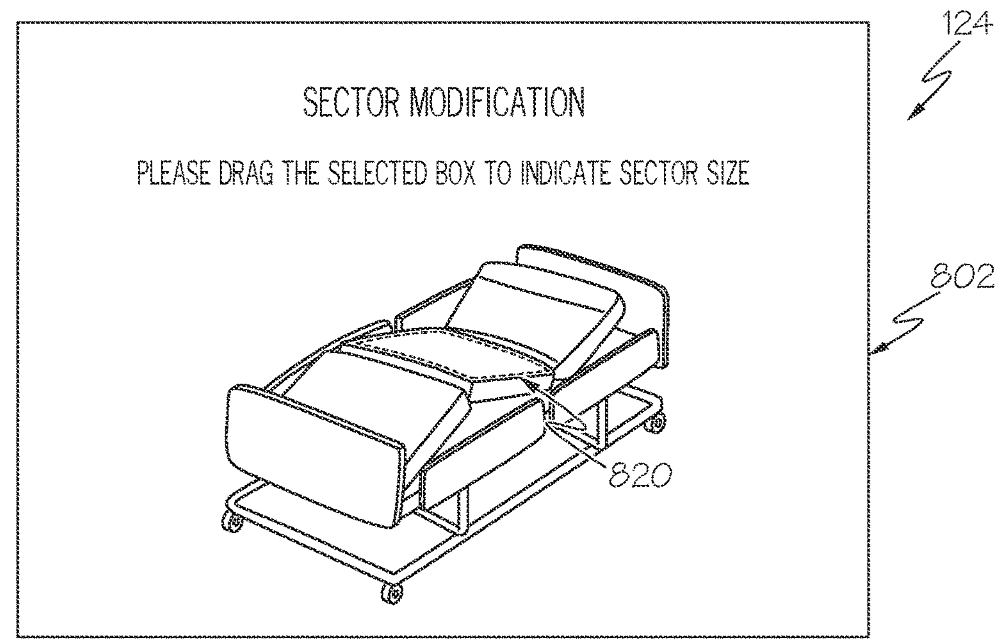
FIG. 8C depicts an illustrative sector modification menu provided by the user interface component of FIG. 8A according to one or more aspects shown and described herein.

As noted herein, the various sectors may be pre-set or may be user changeable. For example, should a user desire to change the size of a sector to ensure adequate therapy is provided to the subject on the person support surface 104 (FIG. 1), the user interface 124 may allow for such a selection. For example, as depicted in FIG. 8C, the user interface 124 may display a "SECTOR MODIFICATION" screen or the like that allows a user to adjust the size of a selected sector and may include instructions for doing such (e.g., "PLEASE DRAG THE SELECTED BOX TO INDICATE SECTOR SIZE"). In such a screen the user may be provided with an ability to select the size of the sector, such as a dashed line box 820 or the like that a user can drag to increase or decrease in size, move, and/or the like. Once a user's size selection is confirmed, information (e.g., data, signals, and/or the like) may be supplied to a controller (e.g., control circuit 648 described herein with respect to FIG. 6), which determines the various bladders included within the selected sector, determines an inflation/deflation schedule, and/or the like, as described herein.

Figure 9:
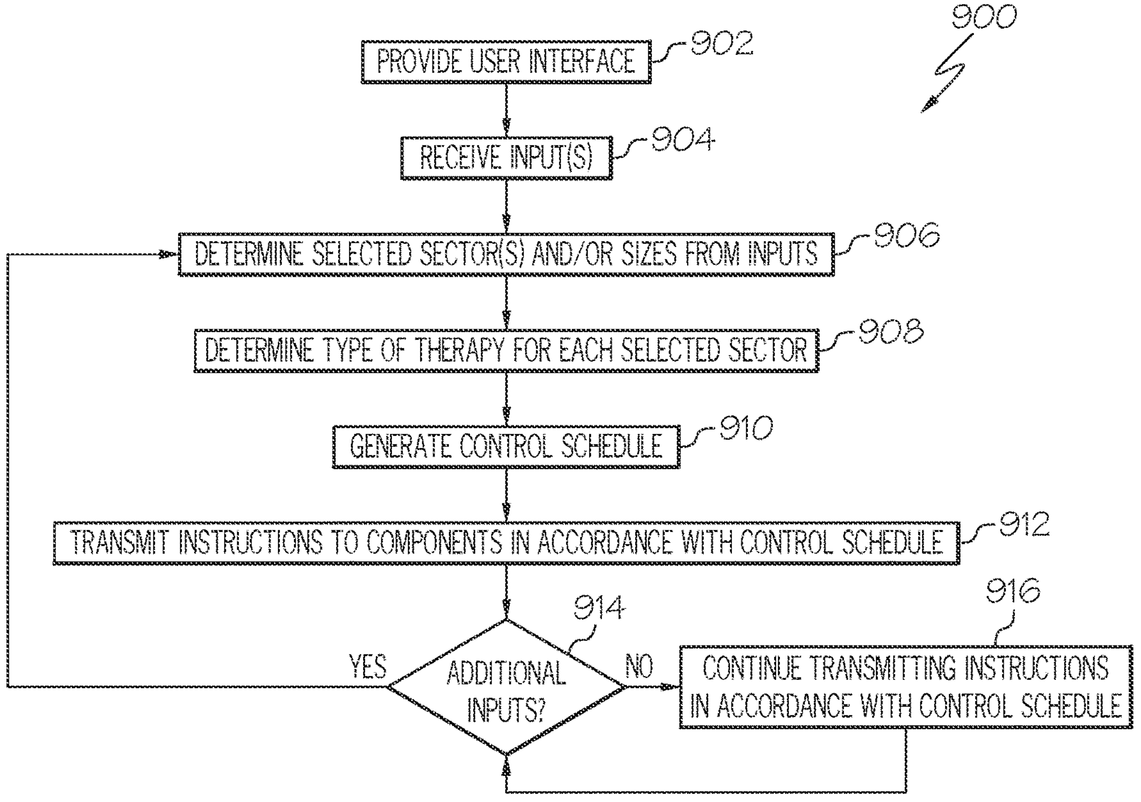
FIG. 9 depicts a flow diagram of an illustrative method of operating a person support surface such that only zones of selected sectors provide therapy according to one or more aspects shown and described herein.

FIG. 9 depicts a block diagram of an illustrative method 900 of operating the person support surface 104 (FIG. 1) in accordance with the aspects described herein. In some aspects, the method 900 may be carried out by one or more of the components of the person support system 100 described herein. For example, the various processes of the method 900 of FIG. 9 may be carried out by one or more components of the control module 600 of FIG. 6, such as the control circuit 648 FIG. 6, including the processor 690 and/or the non-transitory, processor-readable storage medium 692 thereof. That is, the non-transitory, processor-readable storage medium 692 may include one or more programming instructions that, when executed, cause the processor 690 and/or one or more other components of the control module 600 to carry out the various steps of the method 900. In addition, in some aspects, a computer program product may include a medium, such as the non-transitory, processor-readable storage medium 692, which can be supplied as an aftermarket software update to an existing person support system to provide the functionality as described herein (e.g., to allow an existing person support system to operate according to the method). For example, the computer program product containing instructions relating to the method 900 may be software that is delivered to the control module 600 (e.g., a controller) and installed as an update to the existing software installed within the control module 600 (e.g., stored on the non-transitory, processor-readable storage medium 692).

Referring to FIGS. 1, 8A-8C, and 9, the user interface 124 may be provided to a user at block 902. That is, the user interface 124 may display one or more menus that allow a user to select various sectors of the person support surface 104 for which a therapy is to be carried out, the type of therapy being carried out, various parameters of the therapy (e.g., duration, intensity, etc.), adjusting the size of particular sectors, and/or the like. For example, the user interface 124 may provide the therapy actuation menu depicted in FIG. 8B and/or the sector modification menu depicted in FIG. 8C.

At block 904, the user interface 124 may receive one or more inputs from a user. The one or more inputs generally correspond to user interaction with the components of the user interface (e.g., the display 802 and/or the input hardware components 804), which are translated into signals that are usable to determine the user's interaction. Accordingly, at block 906, the selected sector(s) and/or sizes of sector(s) are determined from the inputs. That is, the one or more user inputs are used to determine which sector(s) on the person support surface 104 were selected by the user, which may be determined using a lookup table or the like that has particular user selections mapped to particular sectors. In addition, the one or more user inputs may also be used to determine a size of the sector(s) selected by the user, if the user provides inputs for adjusting sector size, as described herein. Determining the sector(s) includes determining which bladders are located within the selected sectors, which may be completed by accessing another lookup table or the like that has sectors mapped to particular bladders, indicates the location of particular bladders with respect to others, and/or the like. If a user has resized the desired sector(s), the mapping can be utilized to determine which bladders appear to be located within each resized sector based on location and size characteristics of the resized sector. In some aspects, a feedback mechanism may be employed whereby the user interface 124 presents the determined bladders to be included within the resized sector to the user such that the user can confirm or reject the determination. If the user rejects the determination, the user may be requested to adjust the resizing in order for another determination to be made. In some aspects, the user may be provided with an option to save the resized sector to memory for future access so that the user does not need to resize the desired sector every time.

In addition to determining the selected sector(s) and/or sizes of sector(s), another determination of the type of therapy is also completed at block 908. More specifically, the inputs that are received at block 904 are used to determine the type of air therapy desired (e.g., AP, ALP, P&V, CLRT, CLP, and/or the like), as well as which sector(s) in which the therapy is desired. As noted herein, the desired therapy can be selected for each sector such that certain sectors are turned off and not used for therapy, are selected to receive a certain other type of therapy, placed in a baseline pressure state that includes inflation or partial inflation of bladders, but no zone cycling of pressure, and/or the like. For example, the user may select a first sector to receive one air therapy (e.g., AP, ALP) and another sector to receive another air therapy (e.g., P&V). In another example, the user may select a sector encompassing a foot section of the person support surface 104 to receive ALP therapy and the remaining sectors to be placed in an "off" state or a baseline pressure state. In some aspects, a baseline pressure state, an "off" state, or some other state where therapy is not utilized for a particular sector may be a default selection that is implemented unless the user specifies otherwise. That is, if a user selects a sector encompassing the foot section of the person support surface 104, selects a particular air therapy for that sector, and makes no other inputs with respect to other sectors, the determination according to block 908 may be that the remainder of the person support surface 104 outside of the aforementioned selected sector is "selected" as having a standard state with no therapy (e.g., a baseline pressure state, an "off" state, or the like).

Referring also to FIG. 6, once the selected sector(s) and/or sizes, as well as the type of therapy for each sector, is determined according to blocks 906 and 908, a control schedule is generated at block 910. The control schedule is generally a set of instructions (e.g., signals, data, and/or the like) that is transmitted to one or more components of the person support surface 104 to determine and/or adjust inflation, deflation, venting, and/or the like of particular bladders and/or zones of bladders in particular sectors. For example, instructions may be sent to the various valves 628, 636, the air handling unit 562, the connector block 590, the pressure sensor 650, and/or the like to cause particular airflow to particular bladders and/or zones of bladders within each sector in accordance with the control schedule. As a result, the bladders and/or zones of bladders in a particular sector are operated independently of the bladders and/or zones of bladders in other sectors in accordance with the inputs received from the user at block 904.

Operation of the zones of bladders in the various sectors independently of one another in accordance with the received inputs may be completed in any number of ways. In one illustrative example, assuming a first head ALP bladder and a second head ALP bladder connect to a common fill and a common exhaust, the first head ALP bladder and the second ALP bladder may be controlled as one sector. ALP valves connected to the first ALP bladder and the second head ALP bladder have a first position whereby a fluid pathway to each of the head ALP bladders is open to a main fill and a second position whereby a fluid pathway to each of head ALP bladders is open to an exhaust. It should be appreciated that this is merely one example, and the various sectors and/or zones described herein may each be structured in a similar manner. This allows independent control so the various bladders described herein can be optimized by zone and/or sector (or turn ALP on/off according to zone and/or sector).

In some aspects, a user may adjust sector selection, sector size, and/or the like periodically for various reasons (e.g., to increase a subject's comfort, to ensure the correct area on the subject is being treated, and/or the like). As such, the user may provide one or more additional inputs to effect changes. In such aspects, a determination is made at decision block 914 whether additional user inputs are received. If so, the process may repeat at block 906 for the additional inputs. If no additional inputs are received, the process may continue transmitting instructions in accordance with the control schedule at block 916 until additional inputs have been received (as indicated by the arrow from block 916 to decision block 914), until a schedule indicates an end of the therapy, and/or the like.

It should now be understood that the systems described herein include active person support surfaces that includes predefined or user defined sectors that can be independently adjusted to reduce motion sickness and/or increase the comfort of subjects supported thereon. The systems described herein include particular software programming that causes air therapy to be deactivated, reduced, or changed based on a selection provided by a user via a user interface. The systems described herein may be included within any active support surface system, including existing active support surface systems that can be modified with a software update to provide the functionality described herein.

While particular aspects have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

Additional aspects of the present disclosure include the following:

A person support system, comprising: a person support surface comprising a plurality of bladders arranged within a support cushion layer and a foot bladder layer, each one of the plurality of bladders fluidly sealed from each other one of the plurality of bladders; an air supply fluidly coupled to the plurality of bladders such that air is supplied by the air supply to each one of the plurality of bladders; at least one air control box fluidly coupled to the air supply and the plurality of bladders, the at least one air control box configured to direct air from the air supply to periodically inflate and deflate a plurality of zones of bladders of the support cushion layer and the foot bladder layer to provide air therapy; and a controller communicatively coupled to the air supply and the at least one air control box, the controller configured to: receive an input corresponding to at least one selected sector of a plurality of sectors of the person support surface and a selected air therapy for the at least one selected sector, determine which of the plurality of zones of bladders are located within the at least one selected sector, generate a control schedule that directs an inflation level of each of the zones of bladders within the at least one selected sector based on the selected air therapy, and instruct the air supply and the at least one air control box in accordance with the control schedule to adjust an internal air pressure of each of the plurality of bladders of each of the zones within the at least one selected sector independently of one another while providing a different internal air pressure of each remaining bladder located outside the at least one selected sector.

A person support system, comprising: a person support surface comprising a plurality of bladders; an air supply fluidly coupled to the plurality of bladders such that air is supplied by the air supply independently to each one of the plurality of bladders; an air control box fluidly coupled to the air supply and the plurality of bladders, the air control box configured to cause air from the air supply to periodically inflate and deflate a plurality of zones of bladders to provide air therapy; and a controller communicatively coupled to the air supply and the air control box, the controller configured to determine which of the plurality of zones of bladders are located within a sector selected via a user interface, generate a control schedule that directs an inflation level of each of the zones of bladders only within the at least one selected sector based on the selected air therapy, and instruct the air supply and the at least one air control box in accordance with the control schedule.

The person support system according to any one of the previous aspects, wherein the plurality of sectors of the person support surface include a first head sector, a second head sector, a seat sector, and a foot sector.

The person support system according to any one of the previous aspects, further comprising a user interface programmed to receive the input corresponding to the at least one selected sector and the selected air therapy.

The person support system according to any one of the previous aspects, wherein the user interface is further programmed to allow a user to adjust at least one of a size and a location of the at least one selected sector.

The person support system according to any one of the previous aspects, wherein the person support surface further comprises a second plurality of bladders arranged in a turn assist bladder layer, a percussion and vibration bladder, a first lateral side bolster and a second lateral side bolster of a surface foundation layer, a working cushion layer positioned between the first lateral side bolster and the second lateral side bolster of the surface foundation layer, and an advanced articulation bladder layer.

The person support system according to any one of the previous aspects, wherein the selected air therapy for the at least one selected sector is alternating pressure (AP) therapy, alternating low pressure (ALP) therapy, continuous low pressure (CLP) therapy, continuous lateral rotation therapy (CLRT), percussion and vibration (P&V) therapy The person support system according to any one of the previous aspects, wherein the plurality of bladders of the support cushion layer are oriented transverse to a longitudinal axis of the person support surface, and wherein each of the plurality of bladders is cylindrically shaped.

The person support system according to any one of the previous aspects, wherein the foot bladder layer includes a distal end, a proximal end, and a plurality of foot air bladders oriented transverse to a longitudinal axis of the person support surface, and wherein in an expanded state, the plurality of foot air bladders are arranged to realize a first height at a proximal end of the foot bladder layer and a second height at a distal end of the foot bladder layer such that the foot bladder layer slopes downward from the proximal end toward the distal end.

The person support system according to any one of the previous aspects, wherein the person support surface comprises a top encasement portion removably coupled to a bottom encasement portion to define an internal cavity that encloses the plurality of bladders therein.

The person support system according to any one of the previous aspects, wherein a sleeve is defined on a surface of the top encasement portion, wherein the sleeve is positioned to correspond with at least one of a head section, a seat section, or a foot section of at least one person support apparatus, and wherein the sleeve is accessible to place a medical device under a subject positioned on the person support surface.

The person support system according to any one of the previous aspects, wherein the top encasement portion includes at least one fluid flap extending over at least one interlocking device such that the person support surface is one of fluid-resistant or fluid-proof.

The person support system according to any one of the previous aspects, further comprising a microclimate management (MCM) layer positioned over the support cushion layer and the foot bladder layer.

The person support system according to any one of the previous aspects, further comprising a person support apparatus that comprises the person support surface, wherein the person support apparatus comprises at least one of a standard person support apparatus, an advanced articulation person support apparatus, or a chair egress person support apparatus.

The person support system according to any one of claims 1-14, wherein the at least one air control box is at least one of a pneumatic air control box or an electrical air control box.

The person support system according to any one of the previous aspects, wherein the at least one air control box comprises one or more of a valve and a manifold.

The person support system according to any one of the previous aspects, wherein the person support surface further comprises a percussion and vibration bladder layer, and wherein the person support surface further includes an enclosure, the enclosure housing at least one of a pneumatic air control box or an electrical air control box that controls percussion and vibration bladders of the percussion and vibration bladder layer to provide percussion and vibration therapy.

A controller for a person support system, the controller comprising program instructions for causing the controller to: receive an input corresponding to at least one selected sector of a plurality of sectors of a person support surface and a selected air therapy for the at least one selected sector; determine which of a plurality of zones of bladders of the person support surface are located within the at least one selected sector; generate a control schedule that directs an inflation level of each of the zones of bladders within the at least one selected sector based on the selected air therapy; and instruct an air supply and at least one air control box in accordance with the control schedule to adjust an internal air pressure of each of the plurality of bladders of each of the zones within the at least one selected sector independently of one another while providing a different internal air pressure of each remaining bladder located outside the at least one selected sector.

The controller according to any one of the previous aspects, wherein the program instructions further cause the controller to provide a user interface with a selectable option for each of the plurality of sectors.

The controller according to any one of the previous aspects, wherein the program instructions that cause the controller to receive the input further cause the controller to receive the input via the user interface.

The controller according to any one of the previous aspects, wherein the program instructions further cause the controller to provide a sector modification user interface.

The controller according to any one of the previous aspects, wherein the program instructions further cause the controller to: receive a modified sector via the sector modification user interface; and determine which of the plurality of zones of bladders are located in the modified sector.

The controller according to any one of the previous aspects, wherein the modified sector comprises at least one of a moved sector and a resized sector.

The controller according to any one of the previous aspects, wherein the plurality of sectors of the person support surface include a first head sector, a second head sector, a seat sector, and a foot sector.

The controller according to any one of the previous aspects, wherein the program instructions that cause the controller to instruct the at least one air control box further cause the controller to instruct at least one of a valve and a manifold.

A method, comprising: receiving, by a controller associated with a person support surface, an input corresponding to at least one selected sector of a plurality of sectors of the person support surface and a selected air therapy for the at least one selected sector; determining which of a plurality of zones of bladders of the person support surface are located within the at least one selected sector; generating a control schedule that directs an inflation level of each of the zones of bladders within the at least one selected sector based on the selected air therapy; and instructing an air supply and at least one air control box associated with the person support surface in accordance with the control schedule to adjust an internal air pressure of each of the plurality of bladders of each of the zones within the at least one selected sector independently of one another while providing a different internal air pressure of each remaining bladder located outside the at least one selected sector.

The method according to any one of the previous aspects, further comprising providing a user interface with a selectable option for each of the plurality of sectors.

The method according to any one of the previous aspects, wherein receiving the input further comprises receiving the input via the user interface.

The method according to any one of the previous aspects, further comprising providing a sector modification user interface.

The method according to any one of the previous aspects, further comprising: receiving a modified sector via the sector modification user interface; and determining which of the plurality of zones of bladders are located in the modified sector.

The method according to any one of the previous aspects, wherein the modified sector comprises at least one of a moved sector and a resized sector.

The method according to any one of the previous aspects, wherein the plurality of sectors of the person support surface include a first head sector, a second head sector, a seat sector, and a foot sector.

The method according to any one of the previous aspects, wherein instructing the at least one air control box comprises instructing at least one of a valve and a manifold.

A computer program product for controlling a person support surface, the computer program product comprising one or more program instructions stored thereon that, when executed, cause a controller associated with the person support surface to: receive an input corresponding to at least one selected sector of a plurality of sectors of the person support surface and a selected air therapy for the at least one selected sector; determine which of a plurality of zones of bladders of the person support surface are located within the at least one selected sector; generate a control schedule that directs an inflation level of each of the zones of bladders within the at least one selected sector based on the selected air therapy; and instruct an air supply and at least one air control box in accordance with the control schedule to adjust an internal air pressure of each of the plurality of bladders of each of the zones within the at least one selected sector independently of one another while providing a different internal air pressure of each remaining bladder located outside the at least one selected sector.

The computer program product according to any one of the previous aspects, wherein the program instructions further cause the controller to provide a user interface with a selectable option for each of the plurality of sectors.

The computer program product according to any one of the previous aspects, wherein the program instructions that cause the controller to receive the input further cause the controller to receive the input via the user interface.

The computer program product according to any one of the previous aspects, wherein the program instructions further cause the controller to provide a sector modification user interface.

The computer program product according to any one of the previous aspects, wherein the program instructions further cause the controller to: receive a modified sector via the sector modification user interface; and determine which of the plurality of zones of bladders are located in the modified sector.

The computer program product according to any one of the previous aspects, wherein the modified sector comprises at least one of a moved sector and a resized sector.

The computer program product according to any one of the previous aspects, wherein the plurality of sectors of the person support surface include a first head sector, a second head sector, a seat sector, and a foot sector.

The computer program product according to any one of the previous aspects, wherein the program instructions that cause the controller to instruct the at least one air control box further cause the controller to instruct at least one of a valve and a manifold.

The computer program product according to any one of the previous aspects, wherein the computer program product is installable as a software update to the controller.

What is claimed is:

1. A person support system, comprising:

a person support surface comprising a plurality of bladders;

an air supply fluidly coupled to the plurality of bladders such that air is supplied by the air supply independently to each one of the plurality of bladders;

an air control box fluidly coupled to the air supply and the plurality of bladders, the air control box configured to cause the air from the air supply to periodically inflate and deflate a plurality of zones of bladders to provide air therapy; and a controller communicatively coupled to the air supply and the air control box, the controller configured to:

determine which of the plurality of zones of bladders are located within at least one sector of a plurality of sectors by receiving an input via a user interface corresponding to at least one selected sector and a selected air therapy and by accessing information relating to which of the plurality of sectors are mapped to the plurality of bladders, wherein the user interface is programmed to receive one or more inputs to adjust at least a size and a location of the at least one selected sector to define a resized sector by receiving an input corresponding to a customized area containing the resized sector, wherein the resized sector is mapped to one or more of the plurality of zones of bladders that are located within the customized area, and wherein the mapping increases or decreases a size of one or more of the plurality of sectors containing the one or more of the plurality of zones of bladders within the customized area defined by the resized sector by moving one or more zones of the bladders between adjacent sectors, generate a control schedule that directs an inflation level of each of the zones of bladders moved within the resized sector based on the selected air therapy, and instruct the air supply and the air control box in accordance with the control schedule.

2. The person support system according to claim 1, wherein the plurality of sectors of the person support surface include a first head sector, a second head sector, a seat sector, and a foot sector.

3. The person support system according to claim 1, wherein the user interface is programmed to receive the input corresponding to the at least one selected sector and the selected air therapy.

4. The person support system according to claim 1, wherein the person support surface further comprises a second plurality of bladders arranged in a turn assist bladder layer, a percussion and vibration bladder, a first lateral side bolster and a second lateral side bolster of a surface foundation layer, a working cushion layer positioned between the first lateral side bolster and the second lateral side bolster of the surface foundation layer, and an advanced articulation bladder layer.

5. The person support system according to claim 4, wherein the selected air therapy for the at least one selected sector includes alternating pressure (AP) therapy, alternating low pressure (ALP) therapy, continuous low pressure (CLP) therapy, continuous lateral rotation therapy (CLRT), or percussion and vibration (P&V) therapy.

6. The person support system according to claim 1, wherein the person support surface comprises a top encasement portion removably coupled to a bottom encasement portion to define an internal cavity that encloses the plurality of bladders therein.

7. The person support system according to claim 6, wherein a sleeve is defined on a surface of the top encasement portion, wherein the sleeve is positioned to correspond with at least one of a head section, a seat section, or a foot section of at least one person support apparatus, and wherein the sleeve is accessible to place a medical device under a subject positioned on the person support surface.

8. The person support system according to claim 6, wherein the top encasement portion includes at least one fluid flap extending over at least one interlocking device such that the person support surface is one of fluid-resistant or fluid-proof.

9. The person support system according to claim 1, wherein the plurality of bladders of the person support surface are arranged in a support cushion layer and a foot bladder layer of the person support surface, the person support system further comprising a microclimate management (MCM) layer positioned over the support cushion layer and the foot bladder layer of the person support surface.

10. The person support system according to claim 1, wherein the person support surface includes an advanced articulation person support apparatus or a chair egress person support apparatus.

11. The person support system according to claim 1, wherein the air control box is a pneumatic air control box or an electrical air control box.

12. The person support system according to claim 1, wherein the air control box comprises one or more of a valve and a manifold.

13. The person support system according to claim 1, wherein the person support surface further comprises a percussion and vibration bladder layer, and wherein the person support surface further includes an enclosure, the enclosure housing at least one of a pneumatic air control box or an electrical air control box that controls percussion and vibration bladders of the percussion and vibration bladder layer to provide percussion and vibration therapy.

14. The person support system according to claim 1, wherein the resized sector is mapped to individual bladders located within the customized area, and wherein the mapping determines which individual bladders are located within the resized sector.

15. A person support system, comprising:

a person support surface comprising a plurality of bladders arranged within a support cushion layer and a foot bladder layer, each one of the plurality of bladders fluidly sealed from each other one of the plurality of bladders;

an air supply fluidly coupled to the plurality of bladders such that air is supplied by the air supply to each one of the plurality of bladders;

at least one air control box fluidly coupled to the air supply and the plurality of bladders, the at least one air control box configured to direct the air from the air supply to periodically inflate and deflate a plurality of zones of bladders of the support cushion layer and the foot bladder layer to provide air therapy;

a user interface; and a controller communicatively coupled to the air supply and the at least one air control box, the controller configured to:

receive, via the user interface, an input corresponding to at least one selected sector of a plurality of sectors of the person support surface and a selected air therapy for the at least one selected sector, determine which of the plurality of zones of bladders are located within the at least one selected sector of the plurality of sectors by accessing information relating to which of the plurality of sectors are mapped to the plurality of bladders, wherein the user interface is programmed to receive one or more inputs to adjust at least a size and a location of the at least one selected sector to define a resized sector by receiving an input corresponding to a customized area containing the resized sector, wherein the resized sector is mapped to one or more of the plurality of zones of bladders that are located within the customized area, and wherein the mapping increases or decreases a size of one or more of the plurality of sectors containing the one or more of the plurality of zones of bladders within the customized area defined by the resized sector by moving one or more zones of the bladders between adjacent sectors, generate a control schedule that directs an inflation level of each of the zones of bladders moved within the resized sector based on the selected air therapy, and instruct the air supply and the at least one air control box in accordance with the control schedule to adjust an internal air pressure of each of the plurality of bladders of each of the zones within the resized sector independently of one another while providing a different internal air pressure of each remaining bladder located outside the resized sector.

16. The person support system according to claim 15, wherein the plurality of sectors of the person support surface include a first head sector, a second head sector, a seat sector, and a foot sector.

17. The person support system according to claim 15, wherein the person support surface further comprises a second plurality of bladders arranged in a turn assist bladder layer, a percussion and vibration bladder, a first lateral side bolster and a second lateral side bolster of a surface foundation layer, a working cushion layer positioned between the first lateral side bolster and the second lateral side bolster of the surface foundation layer, and an advanced articulation bladder layer.

18. The person support system according to claim 15, wherein the plurality of bladders of the support cushion layer are oriented transverse to a longitudinal axis of the person support surface, and wherein each of the plurality of bladders is cylindrically shaped.

19. The person support system according to claim 15, wherein the foot bladder layer includes a distal end, a proximal end, and a plurality of foot air bladders oriented transverse to a longitudinal axis of the person support surface, and wherein in an expanded state, the plurality of foot air bladders are arranged to realize a first height at the proximal end of the foot bladder layer and a second height at the distal end of the foot bladder layer such that the foot bladder layer slopes downward from the proximal end toward the distal end.

20. The person support system according to claim 15, wherein the resized sector is mapped to individual bladders located within the customized area, and wherein the mapping determines which individual bladders are located within the resized sector.

* * * * *